United States Patent
Deshpande et al.

(10) Patent No.: US 11,348,601 B1
(45) Date of Patent: May 31, 2022

(54) NATURAL LANGUAGE UNDERSTANDING USING VOICE CHARACTERISTICS

(71) Applicant: Amazon Technologies, Inc., Seattle, WA (US)

(72) Inventors: Avani Deshpande, Bothell, WA (US); Jie Liang, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 119 days.

(21) Appl. No.: 16/433,693

(22) Filed: Jun. 6, 2019

(51) Int. Cl.
| | |
|---|---|
| *G10L 25/63* | (2013.01) |
| *G10L 25/30* | (2013.01) |
| *G06N 5/04* | (2006.01) |
| *G10L 15/07* | (2013.01) |
| *G10L 15/00* | (2013.01) |
| *G10L 15/183* | (2013.01) |

(52) U.S. Cl.
CPC .............. *G10L 25/63* (2013.01); *G06N 5/042* (2013.01); *G10L 15/005* (2013.01); *G10L 15/07* (2013.01); *G10L 15/183* (2013.01); *G10L 25/30* (2013.01)

(58) Field of Classification Search
CPC ....................................................... G06N 5/042
USPC .................................. 704/231–257, 270–275
See application file for complete search history.

(56) References Cited

U.S. PATENT DOCUMENTS

| | | | |
|---|---|---|---|
| 6,931,384 B1* | 8/2005 | Horvitz | G10L 15/1822 706/45 |
| 10,733,982 B2* | 8/2020 | Grupen | G06F 40/35 |
| 2011/0112827 A1* | 5/2011 | Kennewick | G10L 15/18 704/9 |
| 2014/0039895 A1* | 2/2014 | Aravamudan | G06F 16/683 704/257 |
| 2015/0340033 A1* | 11/2015 | Di Fabbrizio | G10L 15/22 704/254 |
| 2018/0174055 A1* | 6/2018 | Tirumale | G06Q 10/10 |
| 2019/0266999 A1* | 8/2019 | Chandrasekaran | G09B 5/00 |
| 2019/0324527 A1* | 10/2019 | Presant | G06F 40/30 |

OTHER PUBLICATIONS

Paek et al. "Accommodating Explicit User Expressions of Uncertainty in Voice Search or Something Like That". Interspeech 2008 (Year: 2008).*
Schrank et al. "Automatic detection of uncertainty in spontaneous German Dialogue". Interspeech 2015 (Year: 2015).*
Pon-Barry et al. "Recognizing Uncertainty in Speech". EURASIP Journal on Advances in Signal Processing vol. 2011, Article ID 251753, 11 pages (Year: 2011).*

* cited by examiner

*Primary Examiner* — Jesse S Pullias
(74) *Attorney, Agent, or Firm* — Pierce Atwood LLP

(57) ABSTRACT

A system is provided for using voice characteristics in determining a user intent corresponding to an utterance. The system processes a NLU hypothesis and voice characteristics data, using a trained model, to determine an alternate NLU hypothesis based on the voice characteristics data. The voice characteristics data may indicate if a user's level of uncertainty when speaking the utterance, an age group of the user, a sentiment of the user when speaking the utterance, and other data.

20 Claims, 12 Drawing Sheets

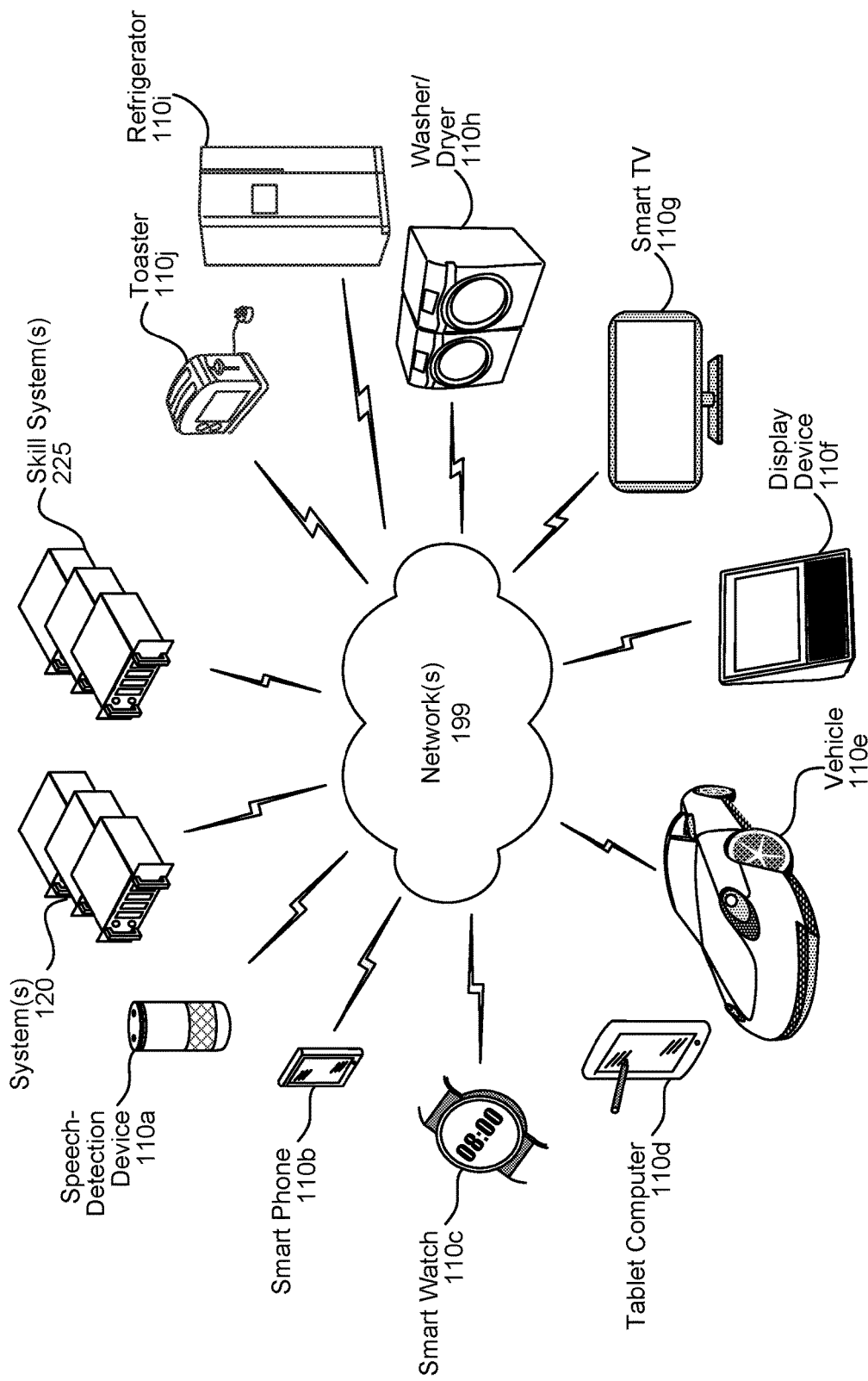

NATURAL LANGUAGE UNDERSTANDING USING VOICE CHARACTERISTICS

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 12 illustrates an example of a computer network for use with the speech processing system.

DETAILED DESCRIPTION

Figure 1:
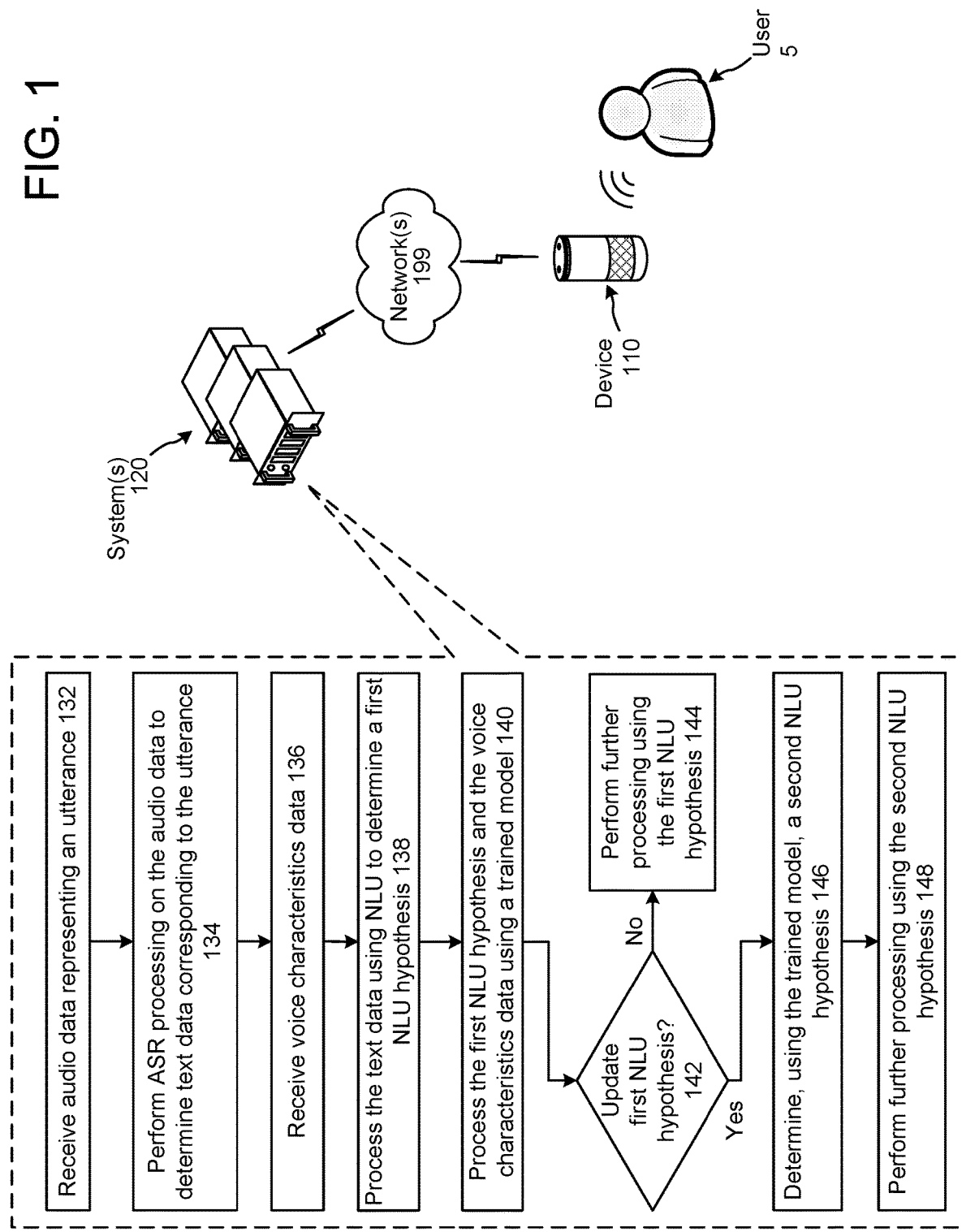
FIG. 1 illustrates a system configured to determine a natural language understanding hypothesis using voice characteristics according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

Certain systems may be configured to perform actions responsive to user inputs. For example, for the user input of "Alexa, play Adele music," a system may output music sung by an artist named Adele. For further example, for the user input of "Alexa, what is the weather," a system may output synthesized speech representing weather information for a geographic location of the user. In a further example, for the user input of "Alexa, send a message to John," a system may capture spoken message content and cause same to be output via a device registered to "John."

A system may receive a user input as speech. For example, a user may speak an input to a device. The device may send audio data, representing the spoken input, to the system. The system may perform ASR processing on the audio data to generate text data representing the user input. The system may perform NLU processing on the text data to determine an intent of the user input as well as portions of the text data that may be used to perform an action responsive to the user input.

To determine an intent of the user input, the system described herein may consider certain characteristics of the user that can be derived from the user's voice. For example, voice characteristics (e.g., pronunciation, pitch, volume, etc.) of the speech captured by the device may indicate if the user's speech indicates that the user is uncertain, angry, scared, sad, sarcastic, in a hurry, etc. The system may use such voice characteristics, along with the text data generated by ASR processing, to determine an intent of the user input. For example, the user may have responded "yes" to a question outputted by the system. The voice characteristics of the captured user input may indicate that the user was uncertain, rushed or sarcastic when saying "yes." In response, the system may output synthesized speech requesting confirmation, such as, "Do you need more time to consider?" or "Are you sure?" The system may thus use the voice characteristics to adjust the system's overall interpretation of the utterance, thus allowing the system to make a more informed analysis beyond simply considering the plain meaning of the words spoken to the system.

The voice characteristics may also indicate the user's age or a user's sentiment when speaking the input. The system may use the voice characteristics to generate an appropriate response to the user input. For example, a child may ask the device "Where do babies come from?" The voice characteristics of the captured user input may indicate that the user is a child, and the system may output synthesized speech with content that is appropriate for a response to a child (which may correspond to settings selected by the child's parents). As another example, a user may say "It is raining," and the voice characteristics of the captured user input may indicate that the user is sad. If the user has opted-in to allow the system to process the user's voice characteristics to generate an appropriate response or interaction, then the system may output synthesized speech such as "Would you like to listen to a song to make you feel better?" or "Would you like to hear a joke to cheer you up?" Thus, the present system may provide a more desirable user experience by considering the user's voice characteristics in determining an intent and selecting how to process that intent to provide output data.

Some of the voice characteristics detection may be enabled while other voice characteristics detection may be disabled. For example, in some cases the system can determine the user's sentiment from the voice characteristics data, but is unable to determine an age group of the user from the voice characteristics data. In such cases, the system may not use the age-based characteristics, and only use the sentiment to determine an appropriate output.

The system may incorporate user permissions and may only perform functionalities disclosed herein, such as voice characteristics detection, if approved by a user, and may configure voice characteristics detection per the user permissions/preferences. For example, the system may perform voice characteristics detection on the speech spoken by the user who opt-in and is associated with the capturing device (and not on speech captured from other users). As such, the systems, devices, components, and techniques described herein may restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located. The system may delete all data relating to voice characteristics detection after a period of time and/or after the audio data has been analyzed and output has been presented and/or viewed by the user. The user may also request the system to delete all data relating to voice characteristics detection. The system may limit access to data relating to voice characteristics detection according to the user permissions selected by the user.

FIG. 1 illustrates a system configured to determine a NLU hypothesis using voice characteristics according to embodiments of the present disclosure. Although the figures and discussion herein illustrate certain operational steps of the system in a particular order, the steps described may be performed in a different order (as well as certain steps removed or added) without departing from the intent of the disclosure. As illustrated in FIG. 1, the system may include device 110 local to a user 5, in communication with one or more systems 120 across one or more networks 199. The operations illustrated in FIG. 1 may be performed during runtime operations.

The system(s) 120 receives (132) audio data. The audio data may include a user input/utterance spoken by the user 5 and captured by the device 110. The system(s) 120 performs (134) automatic speech recognition (ASR) using the audio data to determine text data corresponding to the user input. The text data may be an ASR hypothesis corresponding to the user input. ASR may be performed on the audio data as described in detail below. One of the outputs or results of ASR is language model output data that may include one or more ASR hypotheses (an N-best list) for the user input. The system(s) 120 may determine the text data based on the best ASR hypothesis (selected based on its corresponding score).

The system(s) 120 receives (136) voice characteristics data representing characteristics of the user 5 derived from the audio data. The voice characteristics data may indicate a level of uncertainty detected in the user's voice. The level of uncertainty 702 may be indicated as confidence levels, for example, high, medium or low, or may be indicated as a confidence score. The voice characteristics data may also indicate an age group of the user. The age groups may be baby, toddler, teenager, and adult. The voice characteristics data may indicate a confidence level (or score) for each age group, for example, baby: low, toddler: low, teenager: high, adult: medium. The voice characteristics data may also indicate a sentiment category representing the user's sentiment when speaking. The sentiment categories may include happy, sad, angry, disappointed, and sarcastic. The voice characteristics may indicate a confidence level (or score) for each sentiment category, for example, happy: medium, sad: low, angry: low, disappointed: low, sarcastic: low. The voice characteristics data may include other data derived from the audio data.

The system(s) 120 processes (138) the text data using NLU processing to determine a first NLU hypothesis. NLU processing may be performed on the text data or the ASR hypothesis as described in detail below. The output of NLU processing may be one or more NLU hypotheses (an N-best list) for the user input. The NLU hypothesis may include an intent, slot data, and/or a corresponding score. The system(s) 120 may select the best NLU hypothesis based on its corresponding score.

In an example embodiment, the system(s) 120 may process the audio data representing an utterance received in operation 132 to determine a NLU hypothesis and/or intent corresponding to the utterance, without performing ASR to determine text data corresponding to the utterance. For example, the system(s) 120 may employ a machine learning model configured to process audio data and output an intent and/or a NLU hypothesis corresponding to the audio data. As such, the operation 134 may be optional.

The system(s) 120 processes (140) the first NLU hypothesis and the voice characteristics data using a trained model. The trained model may be configured to determine if a NLU hypothesis needs to be updated based on voice characteristics corresponding to the user input. The trained model may be a statistical model or a neural network machine learning model. In other embodiments, the trained model may be a finite state transducer. The system(s) 120 determines (142) whether the first NLU hypothesis needs to be updated. The system(s) 120 may determine, using the trained model, that the voice characteristics data satisfies a condition. For example, the voice characteristics data may indicate that the user was uncertain when speaking the utterance, or that the user belongs to a particular age group, or that the user exhibited a particular sentiment when speaking the utterance. If one or more of these conditions are satisfied, the system(s) 120 may determine that the first NLU hypothesis needs to be updated.

If the first NLU hypothesis does not need updating, then the system(s) 120 performs (144) further processing using the first NLU hypothesis. For example, the system(s) 120 may send the first NLU hypothesis to a skill system and/or generate output data corresponding to the first NLU hypothesis. In an example embodiment, the system(s) 120 may send the voice characteristics data to the skill system along with the first NLU hypothesis.

If the system(s) 120 determines that the first NLU hypothesis needs to be updated, then the system(s) 120 determines (146), using the trained model, a second NLU hypothesis corresponding to the user input and based on the voice characteristics data. The second NLU hypothesis may have a different intent than the first NLU hypothesis. In some cases, the second NLU hypothesis may have the same intent as the first NLU hypothesis and a different score than the first NLU hypothesis. The second NLU hypothesis may also include an indication that it is based on the voice characteristics data.

The system(s) 120 performs (148) further processing using the second NLU hypothesis. For example, the system(s) 120 may generate output data corresponding to the second NLU hypothesis. The system(s) 120 may select the second NLU hypothesis for further processing based on the score corresponding to the second NLU hypothesis being greater or better than the score corresponding to the first NLU hypothesis. In an example embodiment, the system(s) 120 may send the first NLU hypothesis and the second NLU hypothesis to a skill system, and the skill system may choose which NLU hypothesis to continue processing with.

In this manner, the system(s) 120 uses a trained model to determine if a NLU hypothesis needs to be updated based on voice characteristics data, and determines an alternate NLU hypothesis based on the voice characteristics data. The system(s) 120 is thus configured to take into consideration a user's level of uncertainty, age, sentiment and/or other data (as represented in voice characteristics data) when determining an intent for the user input. The system(s) 120 may then respond in an appropriate way when a user is uncertain, for example, or when a user is a child, or when a user is sad, and thus provide an improved user experience.

In an example embodiment, the system(s) 120 may determine a first NLU hypothesis (operation 138), process the first NLU hypothesis and the voice characteristics data using the trained model (operation 140), and determine a second NLU hypothesis (operation 146), without determining if the first NLU hypothesis needs to be updated (operation 142).

Figure 2:
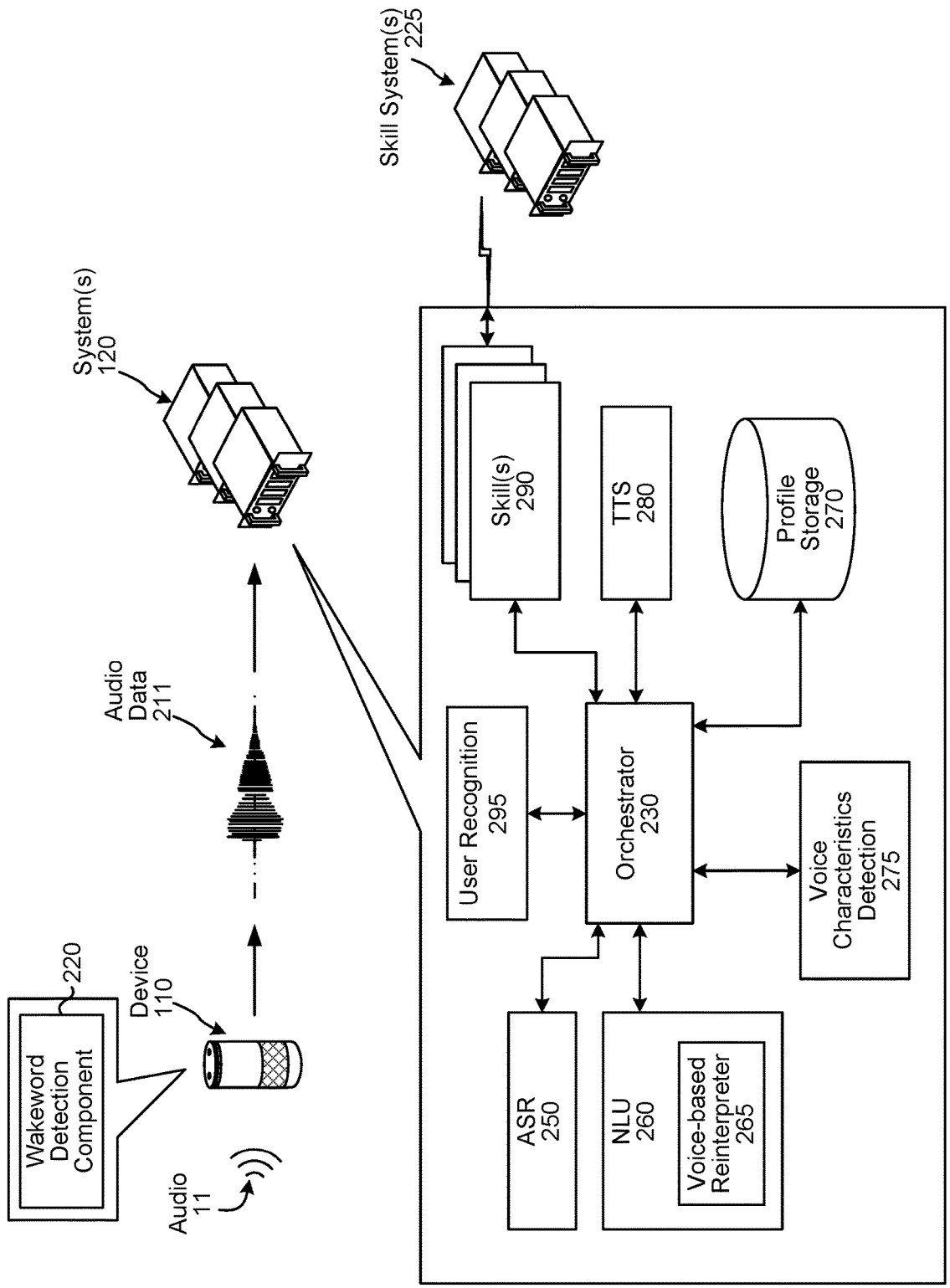
FIG. 2 is a conceptual diagram of components of a system according to embodiments of the present disclosure.

The system may operate using various components as illustrated in FIG. 2. The various components may be located on the same or different physical devices. Communication between various components may occur directly or across a network(s) 199.

An audio capture component(s), such as a microphone or array of microphones of a device 110, captures audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 220 to perform wakeword detection to determine when a user intends to speak an input to the device 110. An example wakeword is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110 may "wake" and begin transmitting audio data 211, representing the audio 11, to the system(s) 120. The audio data 211 may include data corresponding to the wakeword, or the portion of the audio corresponding to the wakeword may be removed by the device 110 prior to sending the audio data 211 to the system(s) 120.

Upon receipt by the system(s) 120, the audio data 211 may be sent to an orchestrator component 230. The orchestrator component 230 may include memory and logic that enables the orchestrator component 230 to transmit various pieces and forms of data to various components of the system, as well as perform other operations as described herein.

The orchestrator component 230 sends the input audio data 211 to a speech processing component 240. An ASR component 250 of the speech processing component 240 transcribes the input audio data 211 into input text data representing one more hypotheses representing speech contained in the input audio data 211. The text data output by the ASR component 250 may thus represent one or more than one (e.g., in the form of an N-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 outputs text data representing one or more ASR hypotheses. The ASR component 250 may also output respective scores for the one or more ASR hypotheses. Such text data and scores may be output, for example, following language model operations by the ASR component 250. Thus the text data output by the ASR component 250 may include a top scoring ASR hypothesis or may include an N-best list of ASR hypotheses. An N-best list may additionally include a respective score associated with each ASR hypothesis represented therein. Each score may indicate a confidence of ASR processing performed to generate the ASR hypothesis with which the score is associated. Further details of the ASR processing are included below.

The NLU component 260 receives the ASR hypothesis/hypotheses (i.e., text data) attempts to make a semantic interpretation of the phrase(s) or statement(s) represented therein. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110, the system(s) 120, a skill 290, a skill system(s) 225, etc.) to execute the intent. For example, if the text data corresponds to "play Adele music," the NLU component 260 may determine an intent that the system(s) 120 output music and may identify "Adele" as an artist. For further example, if the text data corresponds to "what is the weather," the NLU component 260 may determine an intent that the system(s) 120 output weather information associated with a geographic location of the device 110. In another example, if the text data corresponds to "turn off the lights," the NLU component 260 may determine an intent that the system(s) 120 turn off lights associated with the device(s) 110 or the user(s) 5.

The NLU component 260 may send NLU results data (which may include tagged text data, indicators of intent, etc.) to the orchestrator component 230. The orchestrator component 230 may send the NLU results data to a skill(s) 290. If the NLU results data includes a single NLU hypothesis, the orchestrator component 230 may send the NLU results data to the skill(s) 290 associated with the NLU hypothesis. If the NLU results data includes an N-best list of NLU hypotheses, the orchestrator component 230 may send the top scoring NLU hypothesis to a skill(s) 290 associated with the top scoring NLU hypothesis.

The NLU component 260 may include a voice-based reinterpreter component 265 that is configured to determine an alternate intent or rescore the NLU hypothesis generated by the NLU component 260 using the user's voice characteristics represented in the audio data 211. The voice characteristics detection component 275 may determine data representing voice characteristics from the audio data 211, and the orchestrator 230 may send the data to the voice-based reinterpreter component 265 for processing. The voice-based reinterpreter component 265 may send an alternate NLU hypothesis to the orchestrator 230, which may include an indication that the alternate NLU hypothesis was determined using voice characteristics. The voice-based reinterpreter component 265 may use one or more components and techniques described in connection with the NLU component 260 (FIGS. 3 and 4) to determine the alternate NLU hypothesis, an intent and/or slot data.

The voice characteristics detection component 275 may be configured to detect a sentiment of a user from audio data representing speech/utterances from the user, to detect an uncertainty level of a user from audio data, and/or to detect an age group corresponding to a user from audio data.

A "skill" may be software running on the system(s) 120 that is akin to a software application running on a traditional computing device. That is, a skill 290 may enable the system(s) 120 to execute specific functionality in order to provide data or produce some other requested output. The system(s) 120 may be configured with more than one skill 290. For example, a weather service skill may enable the system(s) 120 to provide weather information, a car service skill may enable the system(s) 120 to book a trip with respect to a taxi or ride sharing service, a restaurant skill may enable the system(s) 120 to order a pizza with respect to the restaurant's online ordering system, etc. A skill 290 may operate in conjunction between the system(s) 120 and other devices, such as the device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

In addition or alternatively to being implemented by the system(s) 120, a skill 290 may be implemented by a skill system(s) 225. Such may enable a skill system(s) 225 to execute specific functionality in order to provide data or perform some other action requested by a user.

Types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any preconfigured type of skill.

The system(s) 120 may be configured with a single skill 290 dedicated to interacting with more than one skill system 225.

Unless expressly stated otherwise, reference to a skill, skill device, or skill component may include a skill 290 operated by the system(s) 120 and/or skill operated by the skill system(s) 225. Moreover, the functionality described herein as a skill may be referred to using many different terms, such as an action, bot, app, or the like.

The system(s) 120 may include a TTS component 280 that generates audio data (e.g., synthesized speech) from text data using one or more different methods. Text data input to the TTS component 280 may come from a skill 290, the orchestrator component 230, or another component of the system(s) 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The system(s) 120 may include profile storage 270. The profile storage 270 may include a variety of information related to individual users, groups of users, devices, etc. that interact with the system(s) 120. A "profile" refers to a set of data associated with a user, device, etc. The data of a profile may include preferences specific to the user, device, etc.; input and output capabilities of the device; internet connectivity information; user bibliographic information; subscription information; as well as other information.

The profile storage 270 may include one or more user profiles, with each user profile being associated with a different user identifier. Each user profile may include various user identifying information. Each user profile may also include preferences of the user and/or one or more device identifiers, representing one or more devices registered to the user.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 270 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

The ASR engine 258 may return an N-best list of paths along with their respective recognition scores, corresponding to the top N paths as determined by the ASR engine 258. An application (such as a program or component either internal or external to the ASR component 250) that receives the N-best list may then perform further operations or analysis on the list given the list and the associated recognition scores. For example, the N-best list may be used in correcting errors and training various options and processing conditions of the ASR module 250. The ASR engine 258 may compare the actual correct utterance with the best result and with other results on the N-best list to determine why incorrect recognitions received certain recognition scores. The ASR engine 258 may correct its approach (and may update information in the ASR models 252) to reduce the recognition scores of incorrect approaches in future processing attempts.

Figure 3:
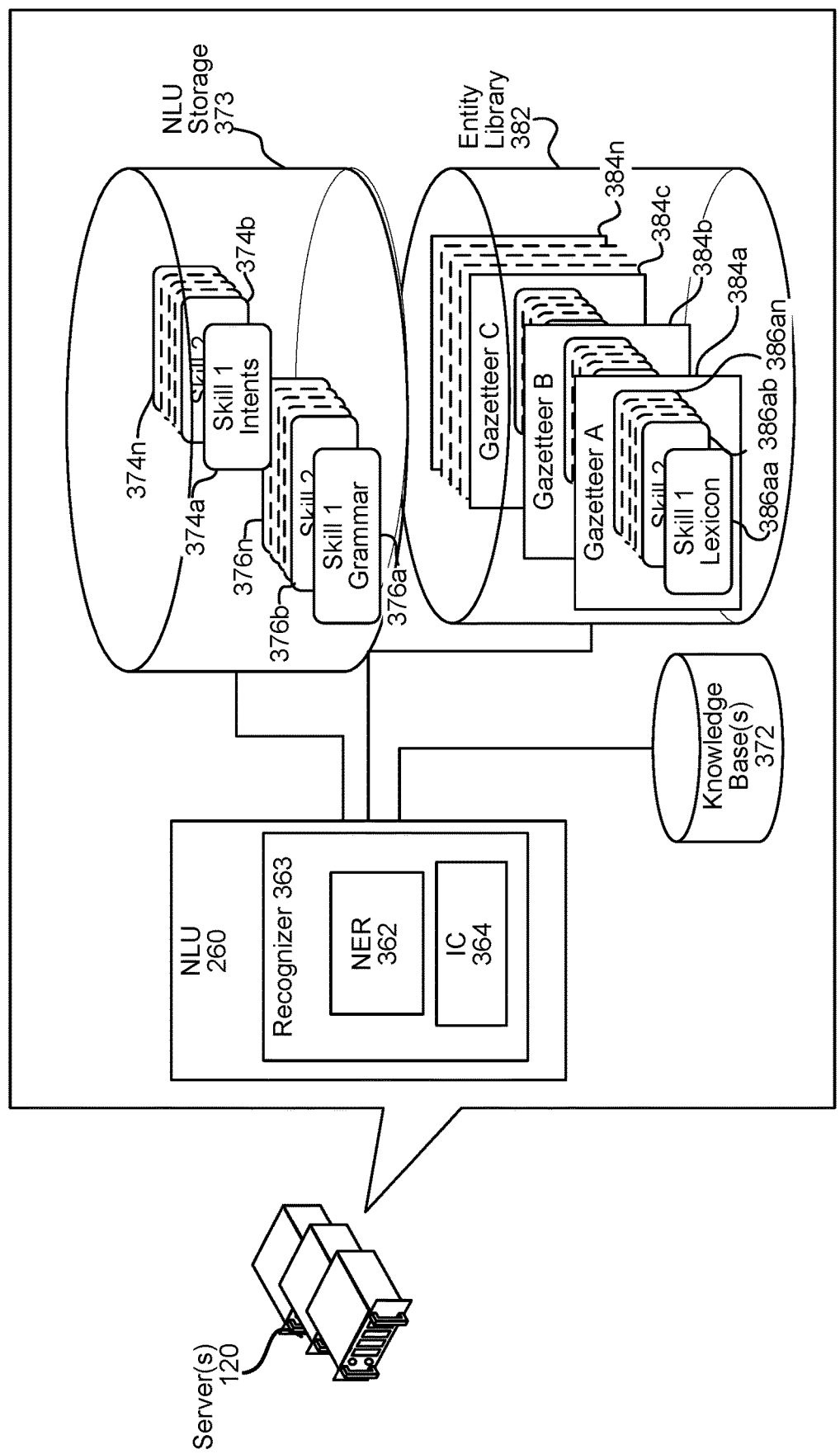
FIG. 3 is a conceptual diagram illustrating how natural language understanding processing is performed according to embodiments of the present disclosure.

FIG. 3 illustrates how NLU processing is performed on text data. Generally, the NLU component 260 attempts to make a semantic interpretation of text data input thereto. That is, the NLU component 260 determines the meaning behind text data based on the individual words and/or phrases represented therein. The NLU component 260 interprets text data to derive an intent of the user as well as pieces of the text data that allow a device (e.g., the device 110, the server(s) 120, skill server(s) 225, etc.) to complete that action.

The NLU component 260 may process text data including several ASR hypotheses (e.g., ASR hypothesis 610). The NLU component 260 may process all (or a portion of) the ASR hypotheses input therein. Even though the ASR component 250 may output multiple ASR hypotheses, the NLU component 260 may be configured to only process with respect to the top scoring ASR hypothesis (e.g., ASR hypothesis 610).

The NLU component 260 may include one or more recognizers 363. Each recognizer 363 may be associated with a different skill 290. Each recognizer 363 may process with respect to text data input (e.g., ASR hypothesis 610) to the NLU component 260. Each recognizer 363 may operate at least partially in parallel with other recognizers 363 of the NLU component 260.

Each recognizer 363 may include a named entity recognition (NER) component 362. The NER component 362 attempts to identify grammars and lexical information that may be used to construe meaning with respect to text data input (e.g., ASR hypothesis 610) therein. The NER component 362 identifies portions of text data that correspond to a named entity that may be applicable to processing performed by a skill 290. The NER component 362 (or other component of the NLU component 260) may also determine whether a word refers to an entity whose identity is not explicitly mentioned in the text data, for example "him," "her," "it" or other anaphora, exophora or the like.

Each recognizer 363, and more specifically each NER component 362, may be associated with a particular grammar model and/or database 373, a particular set of intents/actions 374, and a particular personalized lexicon 386. Each gazetteer 384 may include skill-indexed lexical information associated with a particular user and/or device 110. For example, a Gazetteer A (384a) includes skill-indexed lexical information 386aa to 386an. A user's music skill lexical information might include album titles, artist names, and song names, for example, whereas a user's contact list skill lexical information might include the names of contacts. Since every user's music collection and contact list is presumably different, this personalized information improves entity resolution.

An NER component 362 applies grammar models 376 and lexical information 386 to determine a mention of one or more entities in text data. In this manner, the NER component 362 identifies "slots" (corresponding to one or more particular words in text data) that may be used for later processing. The NER component 362 may also label each slot with a type (e.g., noun, place, city, artist name, song name, etc.).

Each grammar model 376 includes the names of entities (i.e., nouns) commonly found in speech about the particular skill 290 to which the grammar model 376 relates, whereas the lexical information 386 is personalized to the user and/or the device 110 from which the user input originated. For example, a grammar model 376 associated with a shopping skill may include a database of words commonly used when people discuss shopping.

Each recognizer 363 may also include an intent classification (IC) component 364. An IC component 364 parses text data to determine an intent(s). An intent represents an action a user desires be performed. An IC component 364 may communicate with a database 374 of words linked to intents. For example, a music intent database may link words and phrases such as "quiet," "volume off," and "mute" to a <Mute> intent. An IC component 364 identifies potential intents by comparing words and phrases in text data to the words and phrases in an intents database 374.

The intents identifiable by a specific IC component 364 are linked to skill-specific grammar frameworks 376 with "slots" to be filled. Each slot of a grammar framework 376 corresponds to a portion of text data that the system believes corresponds to an entity. For example, a grammar framework 376 corresponding to a <PlayMusic> intent may correspond to sentence structures such as "Play {Artist Name}," "Play {Album Name}," "Play {Song name}," "Play {Song name} by {Artist Name}," etc. However, to make resolution more flexible, grammar frameworks 376 may not be structured as sentences, but rather based on associating slots with grammatical tags.

For example, an NER component 362 may parse text data to identify words as subject, object, verb, preposition, etc. based on grammar rules and/or models prior to recognizing named entities in the text data. An IC component 364 (e.g., implemented by the same recognizer 363 as the NER component 362) may use the identified verb to identify an intent. The NER component 362 may then determine a grammar model 376 associated with the identified intent. For example, a grammar model 376 for an intent corresponding to <PlayMusic> may specify a list of slots applicable to play the identified "object" and any object modifier (e.g., a prepositional phrase), such as {Artist Name}, {Album Name}, {Song name}, etc. The NER component 362 may then search corresponding fields in a lexicon 386, attempting to match words and phrases in text data the NER component 362 previously tagged as a grammatical object or object modifier with those identified in the lexicon 386.

An NER component 362 may perform semantic tagging, which is the labeling of a word or combination of words according to their type/semantic meaning. An NER component 362 may parse text data (e.g., ASR hypothesis 610) using heuristic grammar rules, or a model may be constructed using techniques such as hidden Markov models, maximum entropy models, log linear models, conditional random fields (CRF), and the like. For example, an NER component 362 implemented by a music recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 362 identifies "Play" as a verb, which an IC component 364 may determine corresponds to a <PlayMusic> intent. At this stage, no determination has been made as to the meaning of "mother's little helper" and "the rolling stones," but based on grammar rules and models, the NER component 362 has determined the text of these phrases relates to the grammatical object (i.e., entity) of the user input represented in the text data.

The frameworks linked to the intent are then used to determine what database fields should be searched to determine the meaning of these phrases, such as searching a user's gazetteer 384 for similarity with the framework slots. For example, a framework for a <PlayMusic> intent might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 384 does not resolve a slot/field using gazetteer information, the NER component 362 may search a database of generic words (e.g., in the knowledge base 372). For example, if the text data includes "play songs by the rolling stones," after failing to determine an album name or song name called "songs" by "the rolling stones," the NER component 362 may search the database for the word "songs." In the alternative, generic words may be checked before the gazetteer information, or both may be tried, potentially producing two different results.

An NER component 362 may tag text data to attribute meaning thereto. For example, an NER component 362 may tag "play mother's little helper by the rolling stones" as: {skill} Music, {intent} <PlayMusic>, {artist name} rolling stones, {media type} SONG, and {song title} mother's little helper. For further example, the NER component 362 may tag "play songs by the rolling stones" as: {skill} Music, {intent} <PlayMusic>, {artist name} rolling stones, and {media type} SONG.

Figure 4:
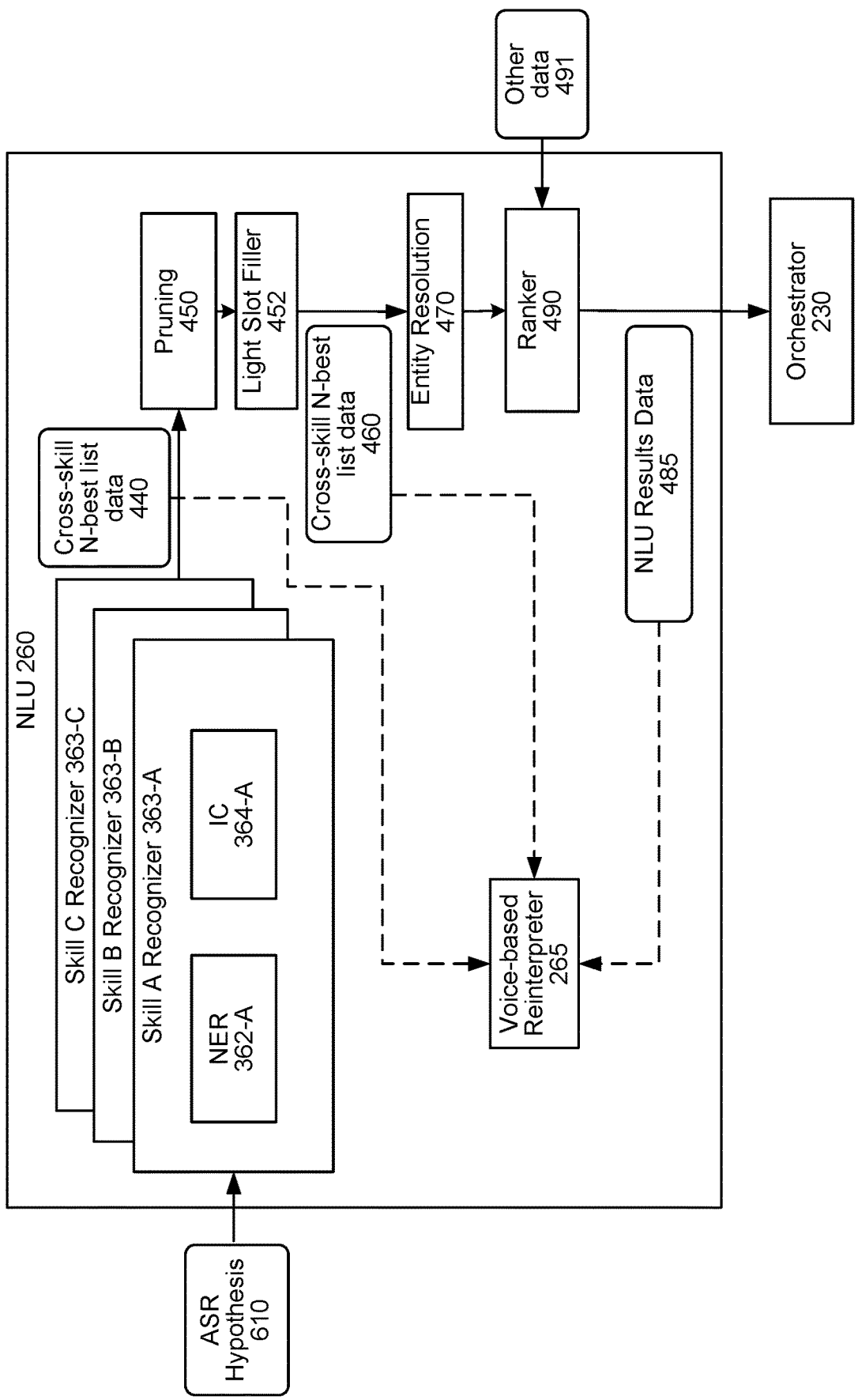
FIG. 4 is a conceptual diagram illustrating how natural language understanding processing is performed according to embodiments of the present disclosure.

The NLU component 260 may generate cross-skill N-best list data 440, which may include a list of NLU hypotheses output by each recognizer 363 (as illustrated in FIG. 4). A recognizer 363 may output tagged text data generated by an NER component 362 and an IC component 364 operated by the recognizer 363, as described above. Each NLU hypothesis including an intent indicator and text/slots may be grouped as an NLU hypothesis represented in the cross-skill N-best list data 440. Each NLU hypothesis may also be associated with one or more respective score(s) for the NLU hypothesis. For example, the cross-skill N-best list data 440 may be represented as, with each line representing a separate NLU hypothesis:

[0.95] Intent: <PlayMusic> ArtistName: Lady Gaga SongName: Poker Face

[0.95] Intent: <PlayVideo> ArtistName: Lady Gaga VideoName: Poker Face

[0.01] Intent: <PlayMusic> ArtistName: Lady Gaga AlbumName: Poker Face

[0.01] Intent: <PlayMusic> SongName: Pokerface

The NLU component 260 may send the cross-skill N-best list data 440 to a pruning component 450. The pruning component 450 may sort the NLU hypotheses represented in the cross-skill N-best list data 440 according to their respective scores. The pruning component 450 may then perform score thresholding with respect to the cross-skill N-best list data 440. For example, the pruning component 450 may select NLU hypotheses represented in the cross-skill N-best list data 440 associated with confidence scores satisfying (e.g., meeting and/or exceeding) a threshold confidence score. The pruning component 450 may also or alternatively perform number of NLU hypothesis thresholding. For example, the pruning component 450 may select a maximum threshold number of top scoring NLU hypotheses. The pruning component 450 may generate cross-skill N-best list data 460 including the selected NLU hypotheses. The purpose of the pruning component 450 is to create a reduced list of NLU hypotheses so that downstream, more resource intensive, processes may only operate on the NLU hypotheses that most likely represent the user's intent.

The NLU component 260 may also include a light slot filler component 452. The light slot filler component 452 can take text data from slots represented in the NLU hypotheses output by the pruning component 450 and alter it to make the text data more easily processed by downstream components. The light slot filler component 452 may perform low latency operations that do not involve heavy operations, such as those requiring reference to a knowledge base. The purpose of the light slot filler component 452 is to replace words with other words or values that may be more easily understood by downstream system components. For example, if an NLU hypothesis includes the word "tomorrow," the light slot filler component 452 may replace the word "tomorrow" with an actual date for purposes of downstream processing. Similarly, the light slot filler component 452 may replace the word "CD" with "album" or the words "compact disc." The replaced words are then included in the cross-skill N-best list data 460.

The NLU component 260 sends the cross-skill N-best list data 460 to an entity resolution component 470. The entity resolution component 470 can apply rules or other instructions to standardize labels or tokens from previous stages into an intent/slot representation. The precise transformation may depend on the skill 290. For example, for a travel skill, the entity resolution component 470 may transform text data corresponding to "Boston airport" to the standard BOS three-letter code referring to the airport. The entity resolution component 470 can refer to a knowledge base that is used to specifically identify the precise entity referred to in each slot of each NLU hypothesis represented in the cross-skill N-best list data 460. Specific intent/slot combinations may also be tied to a particular source, which may then be used to resolve the text data. In the example "play songs by the stones," the entity resolution component 470 may reference a personal music catalog, Amazon Music account, user profile data, or the like. The entity resolution component 470 may output text data including an altered N-best list that is based on the cross-skill N-best list data 460, and that includes more detailed information (e.g., entity IDs) about the specific entities mentioned in the slots and/or more detailed slot data that can eventually be used by downstream components to perform an action responsive to the user input. The NLU component 260 may include multiple entity resolution components 470 and each entity resolution component 470 may be specific to one or more skills 290.

The entity resolution component 270 may not be successful in resolving every entity and filling every slot represented in the cross-skill N-best list data 460. This may result in the entity resolution component 470 outputting incomplete results.

The NLU component 260 may include a ranker component 490. The ranker component 490 may assign a particular confidence score to each NLU hypothesis input therein. The confidence score of an NLU hypothesis may represent a confidence of the system in the NLU processing performed with respect to the NLU hypothesis. The confidence score of a particular NLU hypothesis may be affected by whether the NLU hypothesis has unfilled slots. For example, if an NLU hypothesis associated with a first skill includes slots that are all filled/resolved, that NLU hypothesis may be assigned a higher confidence score than another NLU hypothesis including at least some slots that are unfilled/unresolved by the entity resolution component 470.

The ranker component 490 may apply re-scoring, biasing, and/or other techniques to determine the top scoring NLU hypotheses. To do so, the ranker component 490 may consider not only the data output by the entity resolution component 470, but may also consider other data 491. The other data 491 may include a variety of information. The other data 491 may include skill 490 rating or popularity data. For example, if one skill 290 has a particularly high rating, the ranker component 490 may increase the score of an NLU hypothesis associated with that skill 290, and vice versa. The other data 491 may include information about skills 290 that have been enabled for the user identifier and/or device identifier associated with the current user input. For example, the ranker component 490 may assign higher scores to NLU hypotheses associated with enabled skills 290 than NLU hypotheses associated with non-enabled skills 290. The other data 491 may include data indicating user usage history, such as if the user identifier associated with the current user input is regularly associated with user inputs that invoke a particular skill 290 or does so at particular times of day. The other data 491 may include data indicating date, time, location, weather, type of device 110, user identifier, device identifier, context, as well as other information. For example, the ranker component 490 may consider when any particular skill 290 is currently active (e.g., music being played, a game being played, etc.) with respect to the user or device 110 associated with the current user input. The other data 491 may include device type information. For example, if the device 110 does not include a display, the ranker component 490 may decrease the score associated with an NLU hypothesis that would result in displayable content being presented to a user, and vice versa.

Following ranking by the ranker component 490, the NLU component 260 may output NLU results data 485 to the orchestrator component 230. The NLU results data 485 may include the top scoring NLU hypotheses as determined by the ranker component 490. Alternatively, the NLU results data 485 may include the top scoring NLU hypothesis as determined by the ranker component 490.

The voice-based reinterpreter component 265 may operate on any one of the NLU hypothesis determined by the NLU component 260. For example, the voice-based reinterpreter component 265 may process one or more hypotheses from the cross-skill N-best list data 440, the cross-skill N-best list data 460, and/or the NLU results data 485.

The orchestrator component 230 may select a skill 290, based on the NLU results data 485, for performing an action responsive to the user input. In an example, the orchestrator component 230 may send all (or a portion of) the NLU results data 485 to a skill 290 that is represented in the NLU results data 485 and to be invoked to perform an action responsive to the user input.

Figure 5:
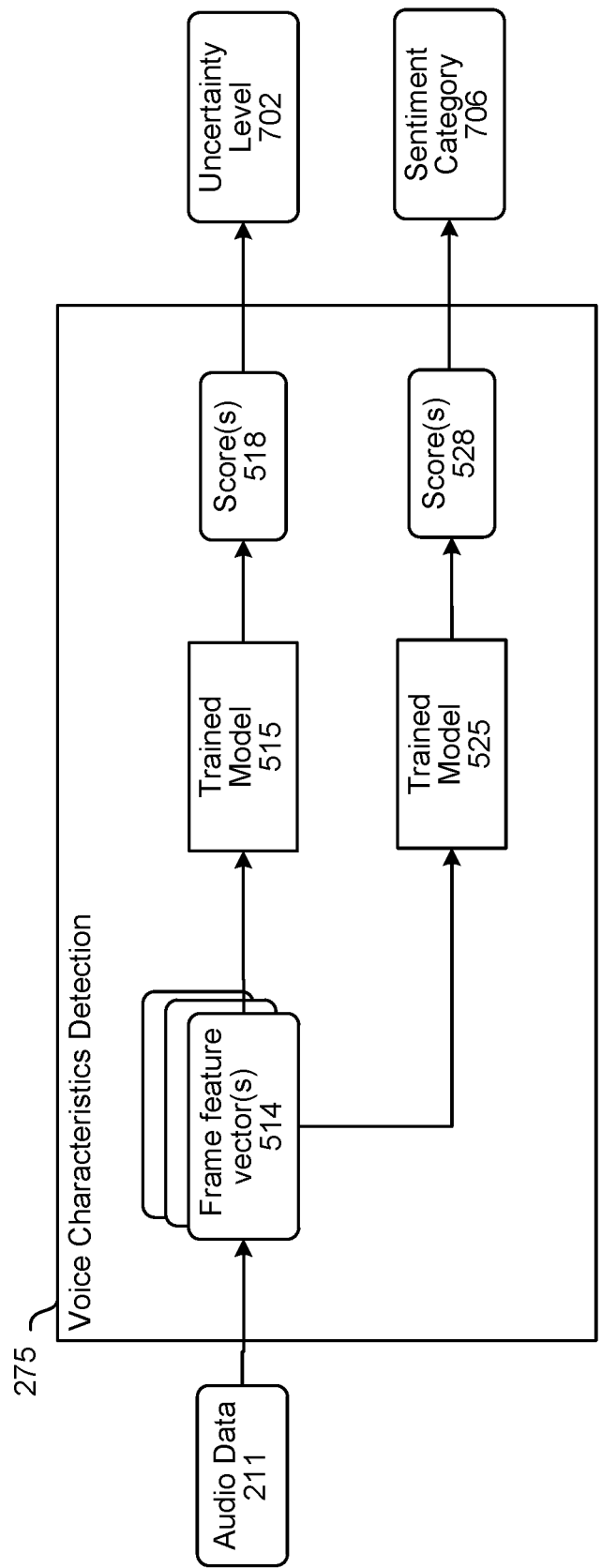
FIG. 5 is a conceptual diagram illustrating a component for determining voice characteristics according to embodiments of the present disclosure.

FIG. 5 is a conceptual diagram illustrating a voice characteristics detection component 275 for determining voice characteristics according to embodiments of the present disclosure. The voice characteristics detection component 275 may include one or more trained models 515, 525 to determine various voice characteristics from input audio data. The voice characteristics detection component 275 may reside with a device 110, with another device proximate to, and in communication with device 110, or with a remote device such as system(s) 120. The voice characteristics detection component 275 may process audio data and determine an uncertainty level 702 of a user when speaking an utterance represented in the audio data. The voice characteristics detection component 275 may process audio data and determine a sentiment category 706 of a user when speaking an utterance represented in the audio data. The voice characteristics detection component 275 may process audio data and determine other data 708 corresponding to the user speaking the utterance, for example, an age group the user may belong to, a gender of the user, and the like.

The voice characteristics detection component 275 may include a voice activity detection (VAD) component (not shown). The VAD component may determine if the audio data 211 includes speech spoken by a human or voice activity by a human, and may determine a portion of the audio data 211 that includes speech or voice activity. The VAD component may send the portion of the audio data 211 including speech or voice activity to the user recognition component 295. The VAD component may employ voice activity detection techniques. Such techniques may determine whether speech is present in audio data based on various quantitative aspects of the audio data, such as the spectral slope between one or more frames of the audio data;

the energy levels of the audio data in one or more spectral bands; the signal-to-noise ratios of the audio data in one or more spectral bands; or other quantitative aspects. In other examples, the VAD component may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

The user recognition component 295 (which may be located on a same or different device as the voice characteristics detection component 275) may communicate with the voice characteristics detection component 275 to determine audio data (which may be a portion of the audio data 211) that corresponds to a particular user profile. The user recognition component 295 may recognize one or more users using various techniques. For example, the user recognition component 295 may identify stored data corresponding to a voice profile associated with the user profile, and determine a confidence level that a portion of the input audio data corresponds to the voice profile based on analyzing the stored data. The user recognition component 295 may determine if the confidence level meets a threshold. If the confidence level for a portion of the input audio data is below a threshold, then the respective portion of input audio is discarded as it does not represent speech from the user associated with the user profile. If the confidence level for a portion of the input audio data meets a threshold, then the respective portion of the input audio data may be stored as the user audio data. The user audio data may be a portion of the audio data 211 that includes speech or one or more utterances from a particular user associated with the user profile. In other words, audio data representing a particular user's speech may be isolated and stored as the user audio data for further analysis. In an example embodiment, the user may be associated with or using the device 110, and may have provided permission to the system(s) 120 to record and analyze his or her voice/conversations to determine voice characteristics corresponding to a dialog exchange or session between the user and a device 110.

Prior to performing further analysis on the user audio data, the system(s) 120 may confirm that the user has granted permissions to analyze speech spoken by the user for voice characteristics detection.

The user audio data may be inputted into an encoder to determine frame feature vector(s) 514. The frame feature vector(s) 514 may represent audio frame level features extracted from the user audio data or audio data 211. One frame feature vector 514 may represent audio frame level features for an audio frame of 20 ms of the audio data 211. The frame feature vector(s) 514 may be derived by spectral analysis of the audio data 211.

In an example embodiment, the voice characteristics detection component 275 determines that the user audio data/audio data 211 includes an entire utterance. That is, the voice characteristics detection component 275 may determine that a beginpoint of the user audio data/audio data 211 corresponds to a beginpoint of an utterance, and an endpoint of the user audio data/audio data 211 corresponds to an endpoint of the utterance. In some embodiments, the frame feature vector(s) 514 may be used to determine utterance feature vector(s) representing utterance-level features of one or more utterances represented in the user audio data/audio data 211. The utterance feature vector(s) may be determined by performing statistical calculations, delta calculation and other processing on the frame feature vector(s) 514 for the audio frames corresponding to an utterance of interest. As such, the utterance feature vector(s) may be a feature matrix whose dimensions are based on the number of audio frames corresponding to the utterance of interest and the dimension of the corresponding frame feature vector 514. The utterance feature vector(s) may be a high-level function or other mathematical functions representing the utterance-level features.

The trained model 515 may process the frame feature vector(s) 514 to determine or more score(s) 518 indicating an uncertainty level 702 of the user when speaking an utterance represented by frame feature vector(s) 514. In another embodiment, the trained model 515 may process the utterance-level feature vectors to determine one or more scores 518. The trained model 515 may be trained, using a training dataset, to process audio frame features and/or utterance level features to determine an uncertainty level. The trained model 515 may be trained to output a score indicating an uncertainty level, for example, a score of 1-2 may indicate a low uncertainty level, a score of 3 may indicate a medium uncertainty level, and a score of 4-5 may indicate a high uncertainty level. In other embodiments, the trained model 515 may be trained to output an indication of low, medium or high for the uncertainty level 702. In an example embodiment, the trained model 515 may be a neural network machine learning model (recurrent neural network, deep learning neural network, a convolutional neural network, etc.), a statistical model, a probabilistic model, or another type of model.

The trained model 525 may process the frame feature vector(s) 514 to determine one or more score(s) 528 indicating a sentiment category 706 for user audio data/audio data 211. In another embodiment, the trained model 525 may process the utterance-level feature vectors to determine one or more scores 528. The trained model 525 may be trained, using a training dataset, to process audio frame features and/or utterance level features to determine a sentiment category 706 for audio data. In an example embodiment, the trained model 525 may predict one of six sentiment categories 706, including but not limited to, happy, sad, neutral, sarcasm, angry, and disappointed. In another embodiment, the sentiment categories may be broad such as positive, neutral, and negative or may be more precise such as angry, happy, distressed, surprised, disgust, or the like. The trained model 525 may be trained to output a score for each sentiment category or a confidence level for each sentiment category, for example, "happy: medium, sad: low, angry: low, disappointed: low, sarcastic: low." Thus the sentiment category 706 may be represented as a data vector. In an example embodiment, the trained model may be a neural network machine learning model (recurrent neural network, deep learning neural network, a convolutional neural network, etc.), a statistical model, a probabilistic model, or another type of model.

Another trained model (not shown) may process the frame feature vector(s) 514 to determine or more score(s) indicating an age group of the user corresponding to the audio data 211. In another embodiment, the trained model may process the utterance-level feature vectors to determine one or more scores. The trained model may be trained, using a training dataset, to process audio frame features and/or utterance level features to determine an age group of the user. The age groups may include, but is not limited to, baby, toddler, teenager and adult. The trained model may be trained to output a score indicating a level of confidence that a user belongs to each of the age groups, for example, "baby: low, toddler: low, teenager: high, adult: medium." Thus the age group may be represented as a data vector indicating a score or level of confidence for each age group. In an example embodiment, the trained model may be a neural network machine learning model (recurrent neural network, deep learning neural network, a convolutional neural network, etc.), a statistical model, a probabilistic model, or another type of model.

Although FIG. 5 shows the trained models 515, 525 processing the same frame feature vector(s) 514, it should be understood that each of trained models 515 and 525 may process different frame feature vector(s) (e.g., 514a, 514b, 514c, etc.).

Figure 6:
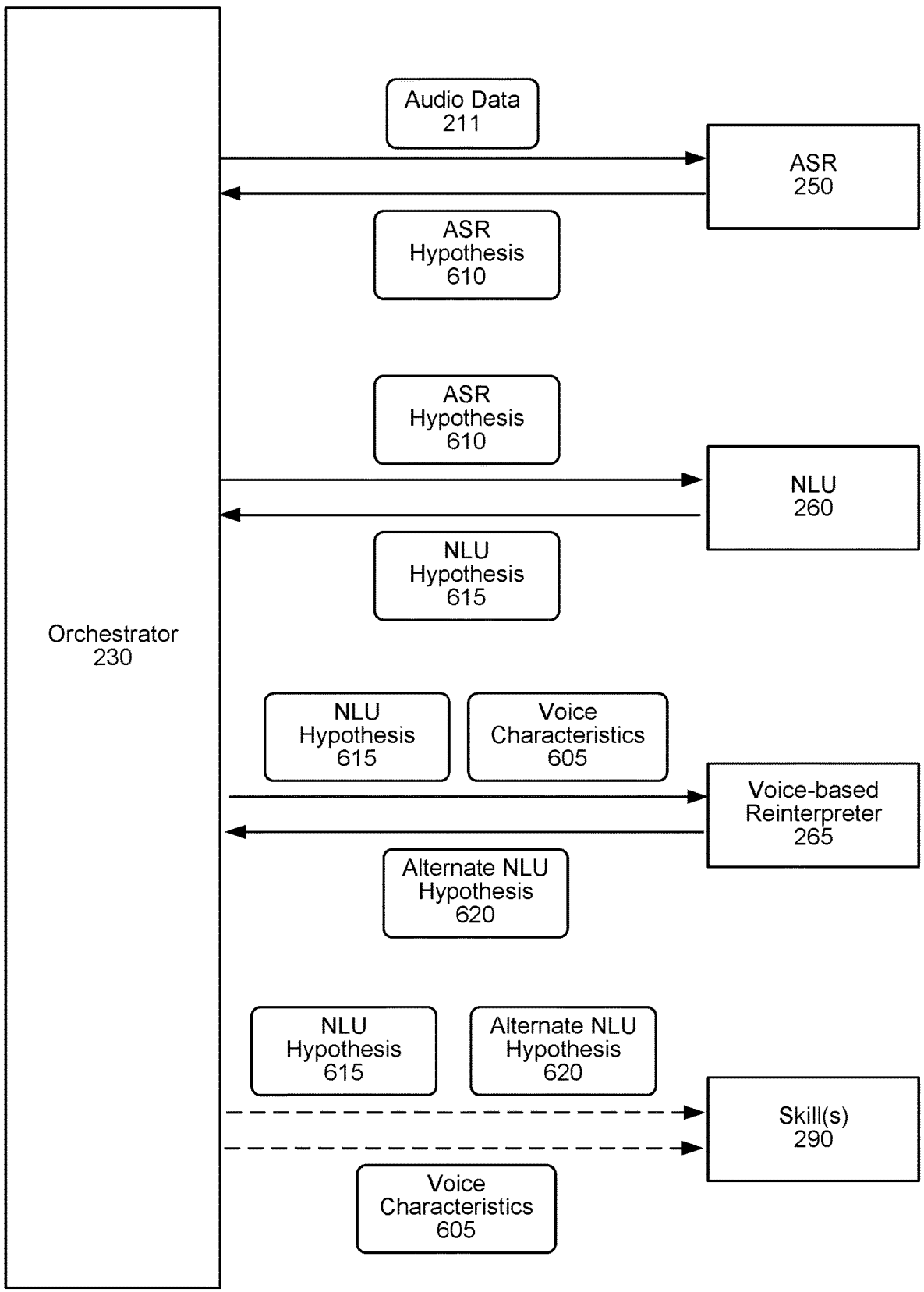
FIG. 6 conceptually illustrates how user inputs may be processed during runtime using the voice-based reinterpreter component according to embodiments of the present disclosure.

FIG. 6 conceptually illustrates how user inputs may be processed during runtime using the voice-based reinterpreter component 265 according to embodiments of the present disclosure. If a user input is received as audio 11 (e.g., is a spoken user input), the orchestrator component 230 may send audio data 211, representing the audio 11, to the ASR component 250. The ASR component 250 may transcribe the audio data 211 into an ASR hypothesis 610, which the ASR component 250 may send to the orchestrator component 230. The ASR component 250 may output a N-best list of ASR hypotheses, and the orchestrator may send the top scoring or the best ASR hypothesis to the NLU component 260 for further processing.

The orchestrator 230 may send the ASR hypothesis 610 to the NLU component 260 to determine the corresponding intent data and corresponding slot data in the form of a NLU hypothesis 615 as described in detail in connection with FIGS. 3 and 4. The NLU component 260 may determine a N-best list of NLU hypotheses. The NLU hypothesis 615 may include an intent, slot data, and a score generated by the NLU component 260. The NLU hypothesis 615 may include one or more NLU hypothesis determined at various stages of NLU processing. For example, the voice-based reinterpreter component 265 may operate on any of the NLU N-best list data determined by the NLU component 260, including the cross-skill N-best list data 440, the cross-skill N-best list data 460 and/or the NLU results data 485.

The orchestrator 230 may send the NLU hypothesis 615 and voice characteristics data 605 to the voice-based reinterpreter component 265. The voice characteristics data 605 may be determined, by one or more components included in the system(s) 120, from the audio 11 and/or the audio data 211. The voice characteristics data 605 may at least indicate a level of uncertainty in the user's voice, an age group that the user may belong to, and a sentiment category representing the user's sentiment when speaking.

The voice-based reinterpreter component 265 may process the NLU hypothesis 615 and the voice characteristics data 605, using a trained model, to determine an alternate NLU hypothesis 620 that is based on the user's voice characteristics. The voice-based reinterpreter component 265 may first determine whether the intent represented in the NLU hypothesis 615 needs to be changed based on the voice characteristics data 605, and then determine an alternate intent to be included in the alternate NLU hypothesis 620. The voice-based reinterpreter component 265 may determine that no change is needed in the intent corresponding to the NLU hypothesis 615, however, the score corresponding to the NLU hypothesis needs to be changed based on the voice characteristics data 605. The voice-based reinterpreter component 265 may determine that no change is needed in the intent or the score corresponding to the NLU hypothesis 615, and may not determine an alternate NLU hypothesis.

The alternate NLU hypothesis 620 may include an intent, slot data and an indication that the alternate NLU hypothesis is based on the user's voice characteristics. In one example, the alternate NLU hypothesis 620 may include the same intent as the NLU hypothesis 615, but have different corresponding scores.

The orchestrator 230 may send the NLU hypothesis 615 and the alternate NLU hypothesis 620 to the skill(s) 290. The skill(s) 290 may choose NLU hypothesis 615 or 620 for further processing. The orchestrator 230 may also send the voice characteristics data 605 to the skill(s) 290. The skill(s) 290 may determine different output data based on the voice characteristics data 605.

In other embodiments, the orchestrator 230 may choose the alternate NLU hypothesis 620 and determine output data corresponding to the intent and slot data included in the alternate NLU hypothesis 620. The orchestrator 230 may also choose output data based on the voice characteristics data 605.

Figure 7:
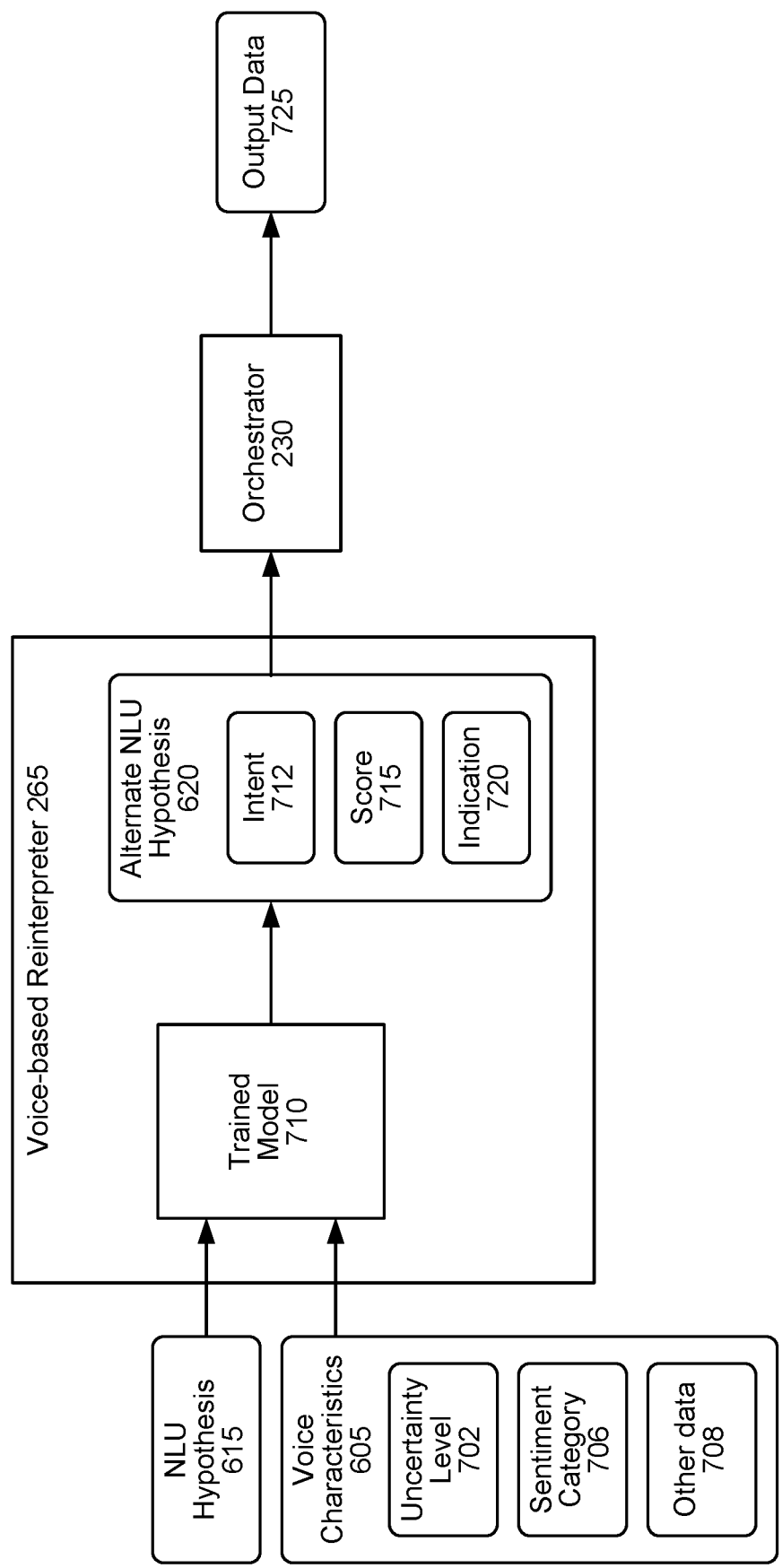
FIG. 7 is a conceptual diagram of the voice-based reinterpreter component according to embodiments of the present disclosure.

FIG. 7 is a conceptual diagram of the voice-based reinterpreter component according to embodiments of the present disclosure. The voice-based reinterpreter component 265 includes a trained model 710. The trained model 710 may be generated as described in connection with FIG. 8. The voice-based reinterpreter component 265 receives a NLU hypothesis 615 from the orchestrator 230 or from the NLU component 260. The NLU hypothesis 615 may include an intent and/or slot data corresponding to the user input/utterance. The voice-based reinterpreter component 265 also receives voice characteristics data 605 from the orchestrator 230 or another component of system(s) 120. The trained model 710 processes the NLU hypothesis 615 and the voice characteristics data 605 to determine whether the NLU hypothesis 615 needs to be changed and determine an alternate NLU hypothesis 620.

The NLU hypothesis 615 may include one or more NLU hypothesis determined at various stages of NLU processing. For example, the NLU hypothesis 615 may include a hypothesis from one or more of the NLU N-best list data determined by the NLU component 260, including the cross-skill N-best list data 440, the cross-skill N-best list data 460 and/or the NLU results data 485.

The voice characteristics data 605 may indicate a level of uncertainty 702 detected in the user's voice. The level of uncertainty 702 may be indicated as confidence levels, for example, high, medium or low, or may be indicated as a confidence score. The voice characteristics data 605 may also indicate a sentiment category 706 representing the user's sentiment when speaking. The sentiment categories may include happy, sad, angry, disappointed, and sarcastic. The voice characteristics 605 may indicate a confidence level (or score) for each sentiment category, for example, happy: medium, sad: low, angry: low, disappointed: low, sarcastic: low. The voice characteristics data 605 may also indicate other data 708 corresponding to the user, such as an age group of the user. The age groups may be baby, toddler, teenager, and adult. The voice characteristics data may indicate a confidence level (or score) for each age group, for example, baby: low, toddler: low, teenager: high, adult: medium. The voice characteristics data 605 may include other data 708 derived from the audio 11 and/or the audio data 211, such as, a user's gender (e.g., male or female) indicated by a score or confidence level (e.g., high, medium, low). For example, the user's gender may be represented as male: high; female: low, or male: medium; female: medium, etc. The voice characteristics data 605 may also indicate other data 708 such as whether fear was detected from the audio data, that is, whether a user was fearful when speaking an utterance. In an example embodiment, such data may be indicated as part of the sentiment category. The voice characteristics data 605 may indicate a score or confidence level (e.g., high, medium, low) for fear.

The trained model 710 may determine that the intent of the NLU hypothesis 615 needs to be changed based on the voice characteristics data 605. Alternatively, the trained model 710 may determine that the score (not the intent) of the NLU hypothesis 615 needs to be changed based on the voice characteristics data 605. Alternatively, the trained model 710 may determine that no changes are needed to NLU hypothesis 615 based on the voice characteristics data 605.

The alternate NLU hypothesis 620 may include an intent 712. The intent 712 may be an alternate intent determined by the trained model 710 using the voice characteristics data 605. In other cases, the intent 712 may be the same as the intent of NLU hypothesis 615.

The alternate NLU hypothesis 620 may also include a score 715 determined by the trained model 710 that may indicate a confidence level that the alternate NLU hypothesis 620 represents the intent and/or slot data corresponding to the ASR hypothesis 610 and the voice characteristics data 605.

The alternate NLU hypothesis 620 may also include an indication 720 that the alternate NLU hypothesis is based on the user's voice characteristics. The indication 720 may be a flag, text data, numerical value, or the like. One or more components of the system(s) 120 may use the indication 720 to choose between the alternate NLU hypothesis 620 and the NLU hypothesis 615 for further processing. In an example embodiment, the orchestrator 230 may generate output data 725 corresponding to the alternate NLU hypothesis 620.

In an example embodiment, the voice-based reinterpreter component 265 may include one or more components described in connection with the NLU component 260, such as a named entity recognizer (NER) component 362, an intent classification (IC) component 364, a pruning component 450, a light slot filler component 452, an entity resolution component 470, and/or a ranker component 490.

In an example embodiment, the trained model 710 is a statistical model or a neural network machine learning model. In another embodiment, the trained model 710 is a finite state transducer (FST). The trained model 710 may be trained to determine an intent using the voice characteristics data 605.

In a non-limiting example, the system(s) 120 may output synthesized speech asking the user a question, for example, "This may take a few minutes. Would you like to continue?" In response, the system(s) 120 may receive audio data 211 representing the utterance "yes." The voice characteristics data 605 corresponding to the audio data 211 may indicate that the user's uncertainty level when speaking "yes" was "high." The NLU component 260 may process the ASR hypothesis 610 corresponding to the audio data 211 and may determine the NLU hypothesis 615 as including a "YesIntent." The trained model 710 may process the NLU hypothesis 615 and the voice characteristics data 605 to determine an alternate intent 712 of "RequestToConfirmIntent" based on the user being uncertain. The orchestrator 230 (or skill 290) may generate output data 725 corresponding to the "RequestToConfirmIntent." For example, the orchestrator 230 (or skill 290) may generate output data 725 that causes the system(s) 120 to output the following synthesized speech (using the TTS component 280) via the device 110: "Do you need more time to consider?" or "Are you sure?"

In another non-limiting example, the system(s) 120 may receive audio data 211 representing the utterance "yes." The voice characteristics data 605 corresponding to the audio data 211 may indicate that the user's uncertainty level when speaking "yes" was "low." The NLU component 260 may process the ASR hypothesis 610 corresponding to the audio data 211 and may determine the NLU hypothesis 615 as including the "YesIntent." The trained model 710 may process the NLU hypothesis 615 and the voice characteristics data 605 to determine that no change in the intent is needed. The trained model 710 may determine that the score corresponding to the NLU hypothesis 615 needs to be changed, for example, the score may be increased, since the user's uncertainty level when saying "yes" was low. The trained model 710 thus may generate the alternate NLU hypothesis 620 as including the "YesIntent" for intent 712 and a score 715 that is greater than the score corresponding to the NLU hypothesis 615. The orchestrator 230 (or skill 290) may generate output data 725 corresponding to the "YesIntent," for example, an output that is responsive to the user's dialog exchange with the device 110.

In yet another non-limiting example, the system(s) 120 may receive audio data 211 representing the utterance "Play me a song." The voice characteristics data 605 corresponding to the audio data may indicate that the utterance was spoken by a child (age group: toddler: "high"). The NLU component 260 may process the ASR hypothesis 610 corresponding to the audio data 211 and may determine the NLU hypothesis 615 as including a "PlayMusicIntent." The trained model 710 may process the NLU hypothesis 615 and the voice characteristics data 605 to determine that no change in the intent or score is needed based on the voice characteristics data 605. The orchestrator 230 may receive the voice characteristics data 605 indicating that the user is a child, and send the voice characteristics data 605 to a skill 290. The orchestrator 230 (or skill 290) may generate output data 725 responsive to the input utterance and appropriate for a child. For example, the orchestrator 230 (or skill 290) may generate output data 725 that causes the system(s) 120 to output a song appropriate for a child, such as a nursery rhyme.

In a non-limiting example, the system(s) 120 may receive audio data 211 representing the utterance "Play me a song" and the corresponding voice characteristics data 605 may indicate that the utterance was spoken by an adult (age group: adult: "high"). The NLU component 260 may process the ASR hypothesis 610 corresponding to the audio data 211 and may determine the NLU hypothesis 615 as including a "PlayMusicIntent." The trained model 710 may process the NLU hypothesis 615 and the voice characteristics data 605 and determine that no change to the NLU hypothesis 615 is needed. The orchestrator 230 (or skill 290) may receive the voice characteristics data 605 indicating that the user is an adult, and may generate output data 725 responsive to the input utterance and appropriate for an adult. For example, the orchestrator 230 (or skill 290) may generate output data 725 that causes the system(s) 120 to play a song appropriate for an adult (for example, a song other than a nursery rhyme).

In another non-limiting example, the system(s) 120 may receive audio data 211 representing the utterance "It is raining today," and the corresponding voice characteristics data 605 may indicate that the user was sad when speaking the utterance (sentiment category: sad: "high"; happy:

"low"). The NLU component 260 may process the ASR hypothesis 610 corresponding to the audio data 211 and may determine the NLU hypothesis 615 as including a "ContentOnlyIntent." The trained model 710 may process the NLU hypothesis 615 and the voice characteristics data 605 to determine that the intent needs to be changed to "CheerUpIntent." The orchestrator 230 (or skill 290) may generate output data 725 corresponding to the "CheerUpIntent." For example, the orchestrator 230 (or skill 290) may generate output data 725 that causes the system(s) 120 to output the following synthesized speech (using the TTS component 280) via the device 110: "Would you like to listen to a song to cheer you up?" or "Would you like to hear a joke?"

In another non-limiting example, the system(s) 120 may receive audio data 211 representing the utterance "Turn on all lights," and the corresponding voice characteristic data 605 may indicate that the user was scared when speaking the utterance (sentiment category: fear: "high"; happy: "low"). The NLU component 260 may process the ASR hypothesis 610 corresponding to the audio data 211 and may determine the NLU hypothesis 615 as including a "TurnOnApplianceIntent." The trained model 710 may process the NLU hypothesis 615 and the voice characteristics data 605 to determine that the intent needs to be changed to "AlarmIntent." The orchestrator 230 (or skill 290) may generate output data 725 corresponding to the "AlarmIntent." For example, the orchestrator 230 (or skill 290) may generate output data 725 that causes the system(s) 120 to output the following synthesized speech (using the TTS component 280) via the device 110: "Sure, I will get some help right away." Additionally, the orchestrator 230 (or skill 290) may generate output data 725 that causes system(s) 120 to send a notification, an alert and/or a message to a security monitoring service, emergency contact, and/or local emergency responders corresponding to the user profile associated with the device 110. The orchestrator 230 (or skill 290) may also generate output data 725 that causes the lights, corresponding to the user profile associated with device 110, to turn on.

In yet another non-limiting example, the system(s) 120 and the user (via the device 110) may engage in the following dialog exchange:
 User: "Alexa, What are your deals today?"
 Device 110: "Here are the deals: Google Home Max, Charcoal color, 379 dollars after 20 dollar discount. Would you like to buy it?"
 User: "Yes that is exactly what I want."

The voice characteristics 605 corresponding to the audio data representing the last utterance ("Yes that is exactly what I want) from the user may indicate that the user had a sarcastic tone when speaking the utterance (sentiment category: sarcasm: "high"). The NLU component 260 may process the ASR hypothesis 610 corresponding to the audio data 211 and may determine the NLU hypothesis 615 as including a "PurchaseIntent." The trained model 710 may process the NLU hypothesis 615 and the voice characteristics data 605 to determine that the intent needs to be changed to "NoIntent." The orchestrator 230 (or skill 290) may generate output data 725 corresponding to the "NoIntent." For example, the orchestrator 230 (or skill 290) may generate output data 725 that causes the system(s) 120 to output the following synthesized speech (using the TTS component 280): "Hmm probably not. Would you like to hear more deals then?"

Figure 8:
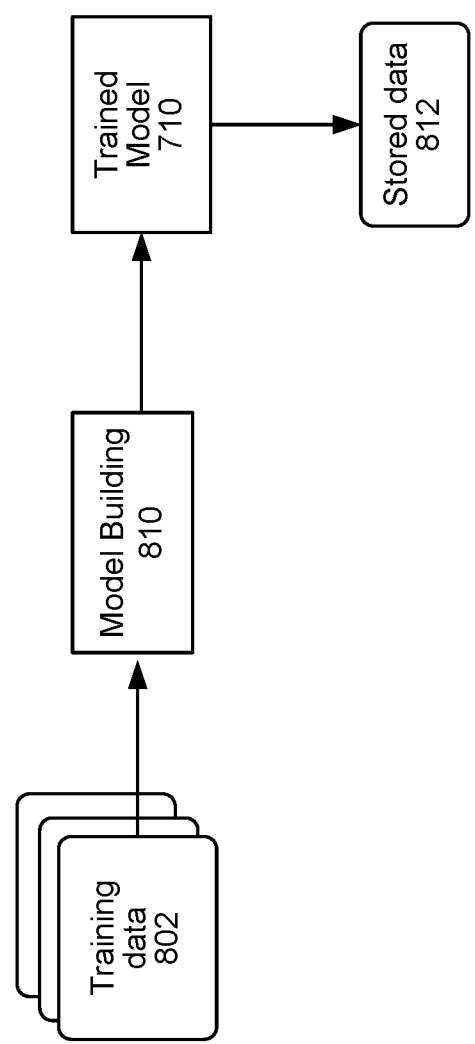
FIG. 8 is a conceptual diagram of building the trained model using training data according to embodiments of the present disclosure.

FIG. 8 conceptually illustrates components for training a machine learning model to determine a NLU hypothesis using voice characteristics. The voice-based reinterpreter component 265 may include a model building component 810. The model building component 810 may be a separate component included in the system(s) 120.

The model building component 810 may train one or more machine learning models to determine an intent and/or NLU hypothesis based on voice characteristics data corresponding to a user input. The model building component 810 may train the one or more machine learning models during offline operations. The model building component 810 may train the one or more machine learning models using a training dataset.

In an example embodiment, the machine learning model is a statistical or probabilistic model, which may model a map of possible outcomes based on the input. In another embodiment, the machine learning model is a neural network (recurrent neural network or deep learning neural network).

In an example embodiment, the training dataset 802 used by the model building component 810 may include mappings of voice characteristics to alternate NLU hypotheses. For example, the training dataset 802 may include key-value pairs representing a link/relationship between a voice characteristic and an alternate NLU hypothesis/intent. For example, the training dataset 802 may include data linking uncertainty: "high" to "RequestToConfirmIntent"; sentiment category: sad: "high" to "CheerUpIntent"; sentiment category: sarcasm: "high" to "NoIntent", etc.

In an example embodiment, the training dataset 802 used by the model building component 810 may include dialog session data corresponding to user interactions with the device 110. As used herein, a "dialog session" may refer to a set of user inputs and corresponding system outputs while a user interacts with a device 110. When the system(s) 120 receives a user input, the system(s) 120 may associate the data (e.g., audio data or text data) representing the user input with a session identifier. The session identifier may be associated with various speech processing data (e.g., an intent indicator(s), a category of skill to be invoked in response to the user input, etc.). The output or action performed by the system(s) 120 in response to the user input may also be associated with the session identifier and be identified as part of the particular dialog session. The system(s) 120 may receive one or more additional/subsequent user inputs, after the system generates an output or performs an action in response to the initial user input. The additional user inputs may be identified as being part of the same dialog session and associated with the session identifier. The system(s) 120 may determine the additional user inputs are part of the same dialog session based on the time elapsed between the initial user input and the additional user input. The training dataset may include the NLU hypotheses corresponding to the user inputs. The training dataset may also include voice characteristics derived from the audio data corresponding to the user inputs. The training dataset may also include alternate NLU hypotheses corresponding to particular voice characteristics.

One or more of the herein described system(s) 120 components may implement one or more trained machine learning models. Various machine learning techniques may be used to train and operate such models. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the trained models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 9:
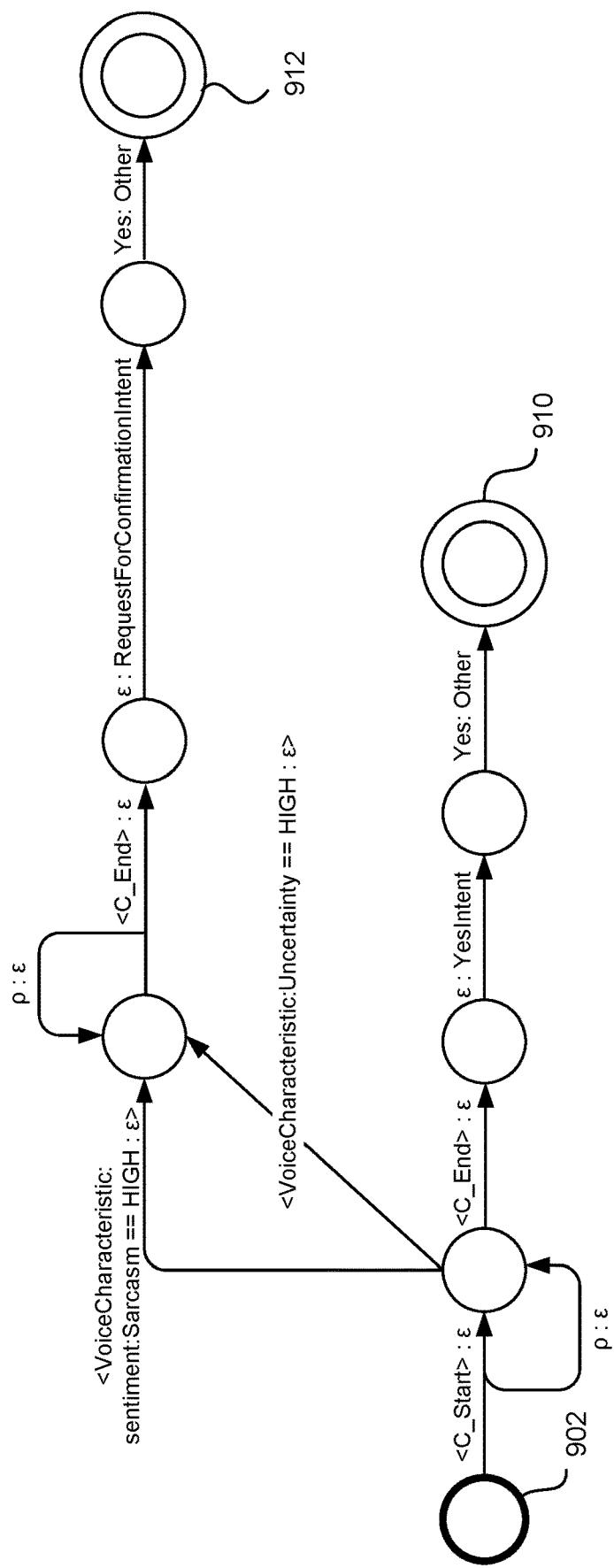
FIG. 9 illustrates a section of a finite state transducer (FST) according to embodiments of the present disclosure.

FIG. 9 illustrates a section of a finite state transducer (FST) according to embodiments of the present disclosure. FSTs can be used in automatic speech recognition systems to encode different knowledge sources (e.g., models) used during natural language processing. An FST may be a directed graph with a defined initial state (e.g., 902) and one or more final states (e.g., 910, 912). The edges (transitions) between states may have input/output labels, where empty labels may be indicated by ε. FIG. 9 illustrates an FST that may be used to determine a NLU hypothesis/intent based on voice characteristics. The system(s) 120 may implement the trained model 710 as an FST. The voice characteristics data 605 may be converted to one or more Boolean expressions that may be used to traverse the FST. For example, the voice characteristics data 605 may indicate the user's sentiment as sarcasm and/or that the user is uncertain. These characteristics may be indicated as "sentiment: Sarcasm=HIGH". The uncertainty level may be indicated as "uncertainty=High." As illustrated in FIG. 9, the FST may be configured so that the Boolean expression "sentiment: Sarcasm=HIGH" or "uncertainty=High" results in the intent being "RequestForConfirmationIntent." As another example, the voice characteristics data 605 may indicate the user is a child (not an adult) and/or that the user is uncertain. These characteristics may be indicated as "age group: Adult !=High" or "age group: Adult NOT High." The uncertainty level may be indicated as "uncertainty=High." The FST may be configured so that the Boolean expression "age group: Adult !=High" or "uncertainty=High" results in the intent being "RequestForConfirmationIntent." Similarly, other voice characteristics may be encoded in the FST, so that the voice-based reinterpreter component 265 may determine NLU hypotheses/intents based on voice characteristics.

Figure 10:
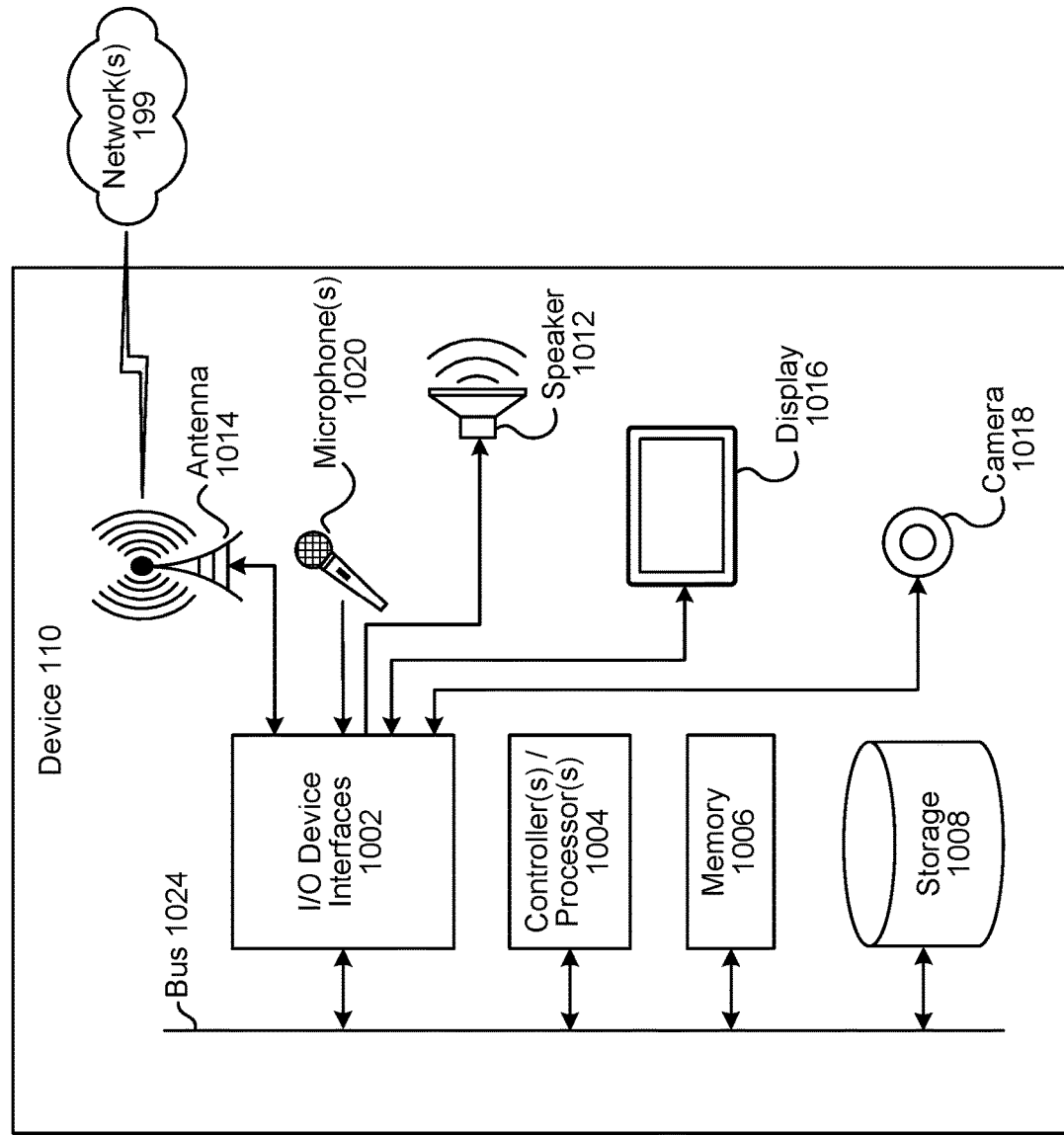
FIG. 10 is a block diagram conceptually illustrating example components of a device according to embodiments of the present disclosure.
Figure 11:
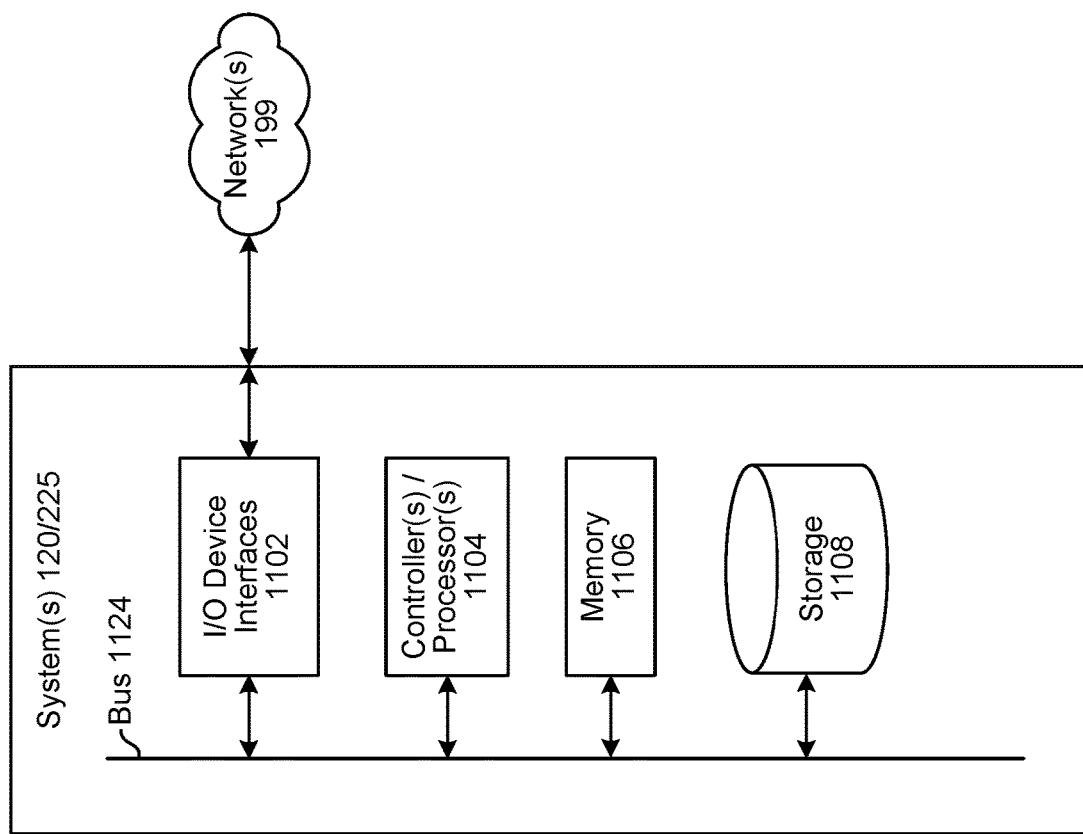
FIG. 11 is a block diagram conceptually illustrating example components of a system according to embodiments of the present disclosure.

FIG. 10 is a block diagram conceptually illustrating a device 110 that may be used with the system. FIG. 11 is a block diagram conceptually illustrating example components of a remote device, such as the system(s) 120, which may assist with ASR processing, NLU processing, etc., and the skill system(s) 225. A system (120/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/225) may be included in the overall system of the present disclosure, such as one or more systems 120 for performing ASR processing, one or more systems 120 for performing NLU processing, one or more skill systems 225 for performing actions responsive to user inputs, etc. In operation, each of these systems may include computer-readable and computer-executable instructions that reside on the respective device (120/225), as will be discussed further below.

Each of these devices (110/120/225) may include one or more controllers/processors (1004/1104), which may each include a central processing unit (CPU) for processing data and computer-readable instructions, and a memory (1006/1106) for storing data and instructions of the respective device. The memories (1006/1106) may individually include volatile random access memory (RAM), non-volatile read only memory (ROM), non-volatile magnetoresistive memory (MRAM), and/or other types of memory. Each device (110/120/225) may also include a data storage component (1008/1108) for storing data and controller/processor-executable instructions. Each data storage component (1008/1108) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (1002/1102).

Computer instructions for operating each device (110/120/225) and its various components may be executed by the respective device's controller(s)/processor(s) (1004/1104), using the memory (1006/1106) as temporary "working" storage at runtime. A device's computer instructions may be stored in a non-transitory manner in non-volatile memory (1006/1106), storage (1008/1108), or an external device(s). Alternatively, some or all of the executable instructions may be embedded in hardware or firmware on the respective device in addition to or instead of software.

Each device (110/120/225) includes input/output device interfaces (1002/1102). A variety of components may be connected through the input/output device interfaces (1002/1102), as will be discussed further below. Additionally, each device (110/120/225) may include an address/data bus (1024/1124) for conveying data among components of the respective device. Each component within a device (110/

120/225) may also be directly connected to other components in addition to (or instead of) being connected to other components across the bus (1024/1124).

Referring to FIG. 10, the device 110 may include input/output device interfaces 1002 that connect to a variety of components such as an audio output component such as a speaker 1012, a wired headset or a wireless headset (not illustrated), or other component capable of outputting audio. The device 110 may also include an audio capture component. The audio capture component may be, for example, a microphone 1020 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1016 for displaying content. The device 110 may further include a camera 1018.

Via antenna(s) 1014, the input/output device interfaces 1002 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1002/1102) may also include communication components that allow data to be exchanged between devices such as different physical servers in a collection of servers or other components.

The components of the device(s) 110, the system(s) 120, or the skill system(s) 225 may include their own dedicated processors, memory, and/or storage. Alternatively, one or more of the components of the device(s) 110, the system(s) 120, or the skill system(s) 225 may utilize the I/O interfaces (1002/1102), processor(s) (1004/1104), memory (1006/1106), and/or storage (1008/1108) of the device(s) 110 system(s) 120, or the skill system(s) 225, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system(s) 120, and the skill system(s) 225, as described herein, are illustrative, and may be located as a stand-alone device or may be included, in whole or in part, as a component of a larger device or system.

As illustrated in FIG. 12, multiple devices (110a-110j, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a toaster 110j may be connected to the network(s) 199 through a wireless service provider, over a WiFi or cellular network connection, or the like. Other devices are included as network-connected support devices, such as the system(s) 120, the skill system(s) 225, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more systems 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving first input data corresponding to a first utterance;
   determining, using the first input data, a first natural language understanding (NLU) hypothesis corresponding to the first utterance, the first NLU hypothesis including a first intent;
   determining, using the first NLU hypothesis, first output data responsive to the first utterance;
   receiving second input data corresponding to a second utterance;
   determining, using the second input data, a second NLU hypothesis corresponding to the second utterance, the second NLU hypothesis including the first intent;
   receiving first voice data representing voice characteristics corresponding to the second utterance;
   determining, using the first voice data and the second NLU hypothesis, that modification to the second NLU hypothesis is required;
   based on the first voice data and the second NLU hypothesis, determining a third NLU hypothesis corresponding to the second utterance, the third NLU hypothesis including a second intent; and
   determining, using the third NLU hypothesis, second output data responsive to the second utterance.

2. The computer-implemented method of claim 1, further comprising:
   determining the first voice data represents a level of uncertainty in the second utterance;
   processing the first voice data and the second NLU hypothesis to determine that the second NLU hypothesis requires modification based on the level of uncertainty in the second utterance; and
   determining the third NLU hypothesis in response to determining that the second NLU hypothesis requires modification.

3. The computer-implemented method of claim 1, further comprising:
   determining, using the first voice data, that the second utterance is spoken by an adult; and
   generating the second output data corresponding to the third NLU hypothesis and based on the second utterance being spoken by the adult.

4. The computer-implemented method of claim 1, further comprising:
   processing first audio data corresponding to a third utterance using automatic speech recognition (ASR) to determine ASR data representing the third utterance;
   processing the ASR data using natural language understanding (NLU) to determine a fourth NLU hypothesis including the first intent and a first score;
   receiving second voice data representing voice characteristics corresponding to the third utterance;
   processing the second voice data and the fourth NLU hypothesis to determine a fifth NLU hypothesis including the second intent and a second score; and
   selecting, based on the first score and the second score, the fifth NLU hypothesis to generate third output data responsive to the third utterance.

5. The computer-implemented method of claim 1, further comprising:
   sending the second NLU hypothesis to a processing component; and
   sending the third NLU hypothesis and indication data to the processing component, the indication data representing that the third NLU hypothesis was determined using the first voice data.

6. The computer-implemented method of claim 1, further comprising:
   determining that the first voice data represents a sentiment of the second utterance;
   processing the first voice data and the second NLU hypothesis to determine that the second NLU hypothesis requires modification based on the sentiment; and
   determining the third NLU hypothesis corresponding to the second utterance and the sentiment.

7. The computer-implemented method of claim 1, further comprising:
   configuring a machine learning model to process input intent data and input voice characteristics data to determine whether the input intent data requires modification based on the input voice characteristics data;
   processing the first voice data and the second NLU hypothesis using the machine learning model to determine that the second NLU hypothesis requires modification based on the first voice data; and
   determining, using the machine learning model, the third NLU hypothesis corresponding to the second utterance and the first voice data.

8. The computer-implemented method of claim 1, further comprising:
   determining that the first voice data indicates a level of uncertainty in the second utterance;
   determining a Boolean expression representing the level of uncertainty;
   traversing a finite state transducer (FST) using the Boolean expression to determine that the second NLU hypothesis requires modification; and
   traversing the FST to determine the third NLU hypothesis.

9. The computer-implemented method of claim 1, further comprising:
   receiving first audio data representing a third utterance;
   processing the first audio data to determine second voice data representing voice characteristics corresponding to the first audio data;
   determining a fourth NLU hypothesis corresponding to the third utterance, the fourth NLU hypothesis including a third intent and a first score;
   determining that the first score requires modification based on the second voice data;
   determining, using the second voice data, a fifth NLU hypothesis corresponding to the third utterance, the fifth NLU hypothesis including the third intent and a second score;
   sending the fourth NLU hypothesis to a processing component; and
   sending the fifth NLU hypothesis and indication data to the processing component, the indication data representing the fifth NLU hypothesis was determined using the second voice data.

10. The computer-implemented method of claim 1, further comprising:
receiving third input data corresponding to a third utterance;
determining, using the third input data, a fourth NLU hypothesis corresponding to the third utterance, the fourth NLU hypothesis including the first intent;
determining, based at least in part on the fourth NLU hypothesis, that the first output data is responsive to the third utterance;
receiving second voice data representing voice characteristics corresponding to the third utterance; and
based on the second voice data, determining third output data responsive to the third utterance, the third output data being different than the first output data.

11. The computer-implemented method of claim 1, further comprising:
receiving third input data corresponding to a third utterance;
determining, using the third input data, a fourth NLU hypothesis corresponding to the third utterance, the fourth NLU hypothesis including the first intent and a first entity;
receiving second voice data representing voice characteristics corresponding to the third utterance;
determining, using the second voice data and the fourth NLU hypothesis, that modification to the fourth NLU hypothesis is required;
based on the second voice data and the fourth NLU hypothesis, determining a fifth NLU hypothesis corresponding to the third utterance, the fifth NLU hypothesis including a second entity; and
determining, using the fifth NLU hypothesis, third output data responsive to the third utterance.

12. A system, comprising:
at least one processor; and
at least one memory including instructions that, when executed by the at least one processor, cause the system to:
receive first input data corresponding to a first utterance;
determine, using the first input data, a first natural language understanding (NLU) hypothesis corresponding to the first utterance, the first NLU hypothesis including a first intent;
determine using the first NLU hypothesis, first output data responsive to the first utterance;
receive second input data corresponding to a second utterance;
determine, using the second input data, a second NLU hypothesis corresponding to the second utterance, the second NLU hypothesis including the first intent;
receive first voice data representing voice characteristics corresponding to the second utterance;
determine, using the first voice data and the second NLU hypothesis, that modification to the second NLU hypothesis is required;
based on the first voice data and the second NLU hypothesis, determine a third NLU hypothesis corresponding to the second utterance, the third NLU hypothesis including a second intent; and
determine, using the third NLU hypothesis, second output data responsive to the second utterance.

13. The system of claim 12, wherein the at least one memory includes further instructions that, when executed by the at least one processor cause the system to:
determine the first voice data represents a level of uncertainty in the second utterance;
process the first voice data and the second NLU hypothesis to determine that the second NLU hypothesis requires modification based on the level of uncertainty in the second utterance; and
determine the third NLU hypothesis in response to the determination that the second NLU hypothesis requires modification.

14. The system of claim 12, wherein the at least one memory includes further instructions that, when executed by the at least one processor cause the system to:
determine, using the first voice data, that the second utterance is spoken by an adult; and
generate the second output data corresponding to the third NLU hypothesis and based on the second utterance being spoken by the adult.

15. The system of claim 12, wherein the at least one memory includes further instructions that, when executed by the at least one processor cause the system to:
process first audio data corresponding to a third utterance using automatic speech recognition (ASR) to determine ASR data representing the third utterance;
process the ASR data using natural language understanding (NLU) to determine a fourth NLU hypothesis including the first intent and a first score;
receiving second voice data representing voice characteristics corresponding to the third utterance;
process the second voice data and the fourth NLU hypothesis to determine a fifth NLU hypothesis including the second intent and a second score; and
select, based on the first score and the second score, the fifth NLU hypothesis to generate third output data responsive to the third utterance.

16. The system of claim 12, wherein the at least one memory includes further instructions that, when executed by the at least one processor cause the system to:
send the second NLU hypothesis to a processing component; and
send the third NLU hypothesis and indication data to the processing component, the indication data representing that the third NLU hypothesis was determined using the first voice data.

17. The system of claim 12, wherein the at least one memory includes further instructions that, when executed by the at least one processor cause the system to:
determine that the first voice data represents a sentiment of the second utterance;
process the first voice data and the second NLU hypothesis to determine that the second NLU hypothesis requires modification based on the sentiment; and
determine the third NLU hypothesis corresponding to the second utterance and the sentiment.

18. The system of claim 12, wherein the at least one memory includes further instructions that, when executed by the at least one processor cause the system to:
configure a machine learning model to process input intent data and input voice characteristics data to determine whether the input intent data requires modification based on the input voice characteristics data;
process the first voice data and the second NLU hypothesis using the machine learning model to determine that the second NLU hypothesis requires modification based on the first voice data; and
determine, using the machine learning model, the third NLU hypothesis corresponding to the second utterance and the first voice data.

19. The system of claim 12, wherein the at least one memory includes further instructions that, when executed by the at least one processor cause the system:
- determine that the first voice data indicates a level of uncertainty in the second utterance;
- determine a Boolean expression representing the level of uncertainty;
- traverse a finite state transducer (FST) using the Boolean expression to determine that the second NLU hypothesis requires modification; and
- traverse the FST to determine the third NLU hypothesis.

20. The system of claim 12, wherein the at least one memory includes further instructions that, when executed by the at least one processor cause the system:
- receive third input data corresponding to a third utterance;
- determine, using the third input data, a fourth NLU hypothesis corresponding to the third utterance, the fourth NLU hypothesis including the first intent;
- determine, based at least in part on the fourth NLU hypothesis, that the first output data is responsive to the third utterance;
- receive second voice data representing voice characteristics corresponding to the third utterance; and
- based on the second voice data, determine third output data responsive to the third utterance, the third output data being different than the first output data.

* * * * *